United States Patent [19]

Nelson et al.

[11] Patent Number: 4,628,493
[45] Date of Patent: Dec. 9, 1986

[54] SENSOR SYSTEM WITH TIME DIVISION MULTIPLEXING TELEMETRY

[75] Inventors: David E. Nelson; David M. Berg; Robert J. Hannon, all of Rochester, N.Y.

[73] Assignee: Hydroacoustics Inc., Rochester, N.Y.

[21] Appl. No.: 350,902

[22] Filed: Feb. 22, 1982

[51] Int. Cl.$^4$ .............................. G01V 1/22; H04J 3/00
[52] U.S. Cl. .................................. 367/79; 340/870.13; 340/870.14; 370/100; 370/4
[58] Field of Search ................ 340/870.13, 870.14, 340/858; 370/100, 103, 109, 4, 29, 50, 58, 77, 85; 367/20, 21, 64, 76, 78, 79, 177, 130, 134; 360/23

[56] References Cited

U.S. PATENT DOCUMENTS

| | | | |
|---|---|---|---|
| 3,851,302 | 11/1974 | Schmitt | 367/79 |
| 3,911,226 | 10/1975 | Angelle et al. | 367/79 |
| 3,990,036 | 11/1976 | Savit | 367/14 |
| 3,996,553 | 12/1976 | Siems et al. | 367/79 |
| 4,005,273 | 1/1977 | Siems | 370/113 |
| 4,023,140 | 5/1977 | Siems et al. | 367/79 |
| 4,072,923 | 2/1978 | Siems et al. | 367/78 |
| 4,089,584 | 5/1978 | Polczynski | 455/612 |
| 4,092,629 | 5/1978 | Siems et al. | 367/79 |
| 4,107,518 | 8/1978 | McMahon | 455/601 |
| 4,117,448 | 9/1978 | Siems | 367/79 |
| 4,218,767 | 8/1980 | Joosten et al. | 367/79 |
| 4,234,968 | 11/1980 | Singh | 455/607 |
| 4,301,522 | 11/1981 | Guyot et al. | 367/123 |
| 4,408,307 | 10/1983 | Harris | 367/79 |

OTHER PUBLICATIONS

Hamming "Digital Filters" Prentice-Hall Inc. (1977), available at Library of Congress.
McMahon, "Efficiency Limitations Imposed by Thermodynamics on Optical Coupling in Fiber-Optic Data Links" J. of Optical Society of America, vol. 65, No. 12, Dec. (1975), pp. 1479–1482.
Nelson et al., "Passive Multiplexing System for Fiber-Optic Sensors" Applied Optics, vol. 19, No. 17, Sep. (1980), pp. 2917–2920.

Primary Examiner—Salvatore Cangialosi
Assistant Examiner—Ian J. Lobo
Attorney, Agent, or Firm—M. LuKacher

[57] ABSTRACT

A seismic array containing a large number of seismic sensors, which may be optical hydrophones, has successive sections, each of which contains a subarray of sensor channels, interconnected by a fiber optic signal transmission line via telemetry modules. Synchronizing signals for initiating successive scans of the sensors in the array and timing the multiplexing of the channels are transmitted along the signal transmission line from the tail end of the line through telemetry modules to the head end. Equipment for receiving, demultiplexing and processing the seismic data is provided at the head end. The array may be towed as a seismic streamer and the head end equipment located topside on the towing vessel. The telemetry modules provide hybrid optical/electrical operation such that array sections including the optical hydrophones and fiber optic links are coupled to each other exclusively by electrical connectors. Submultiplexing of each subarray of sensors (hydrophones) is carried out by the telemetry module under control of scan synchronizing and timing signals so as to avoid the need for anti-aliasing filters and sample and hold circuits associated with the hydrophones in the array, while improving the signal to noise ratio of the seismic data signals derived from the array, in spite of shot or photon noise and also minimizing timing skew errors.

56 Claims, 14 Drawing Figures

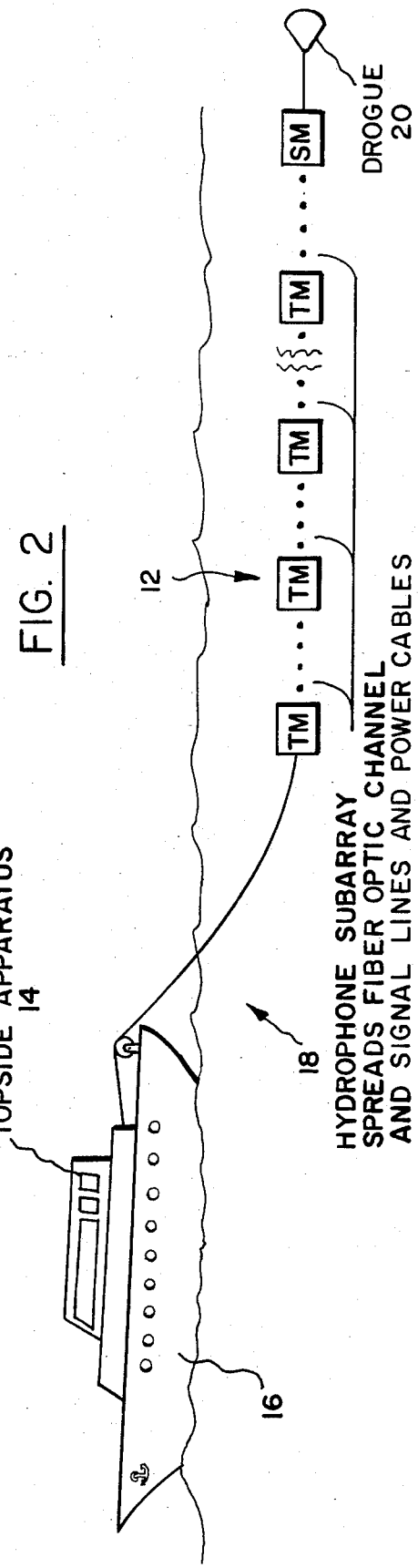
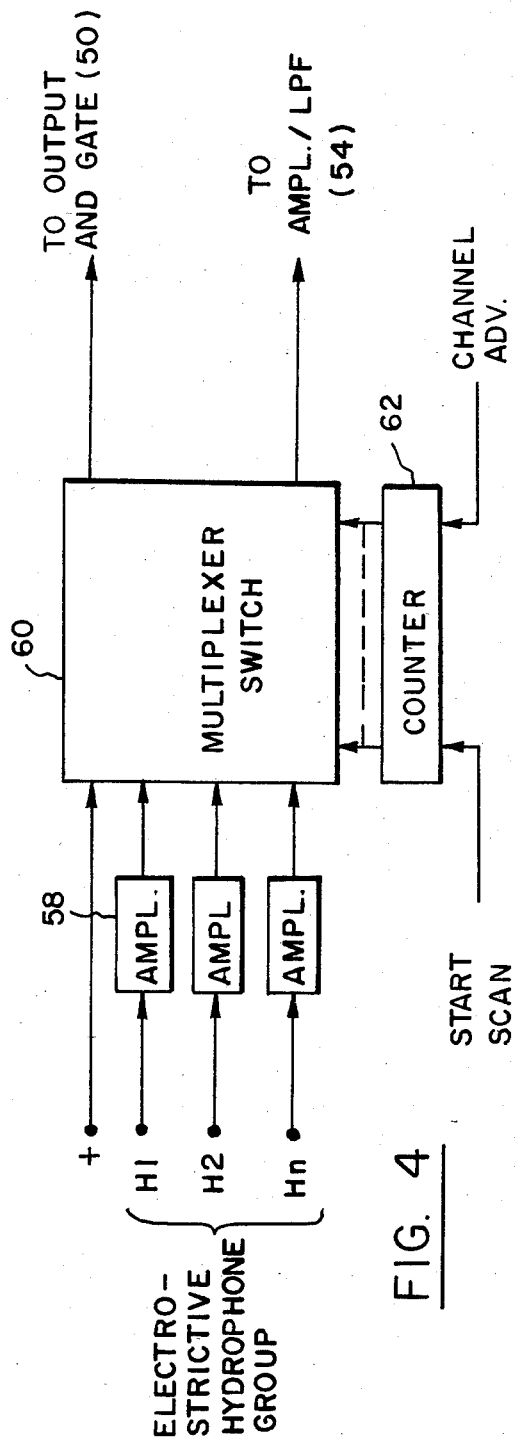

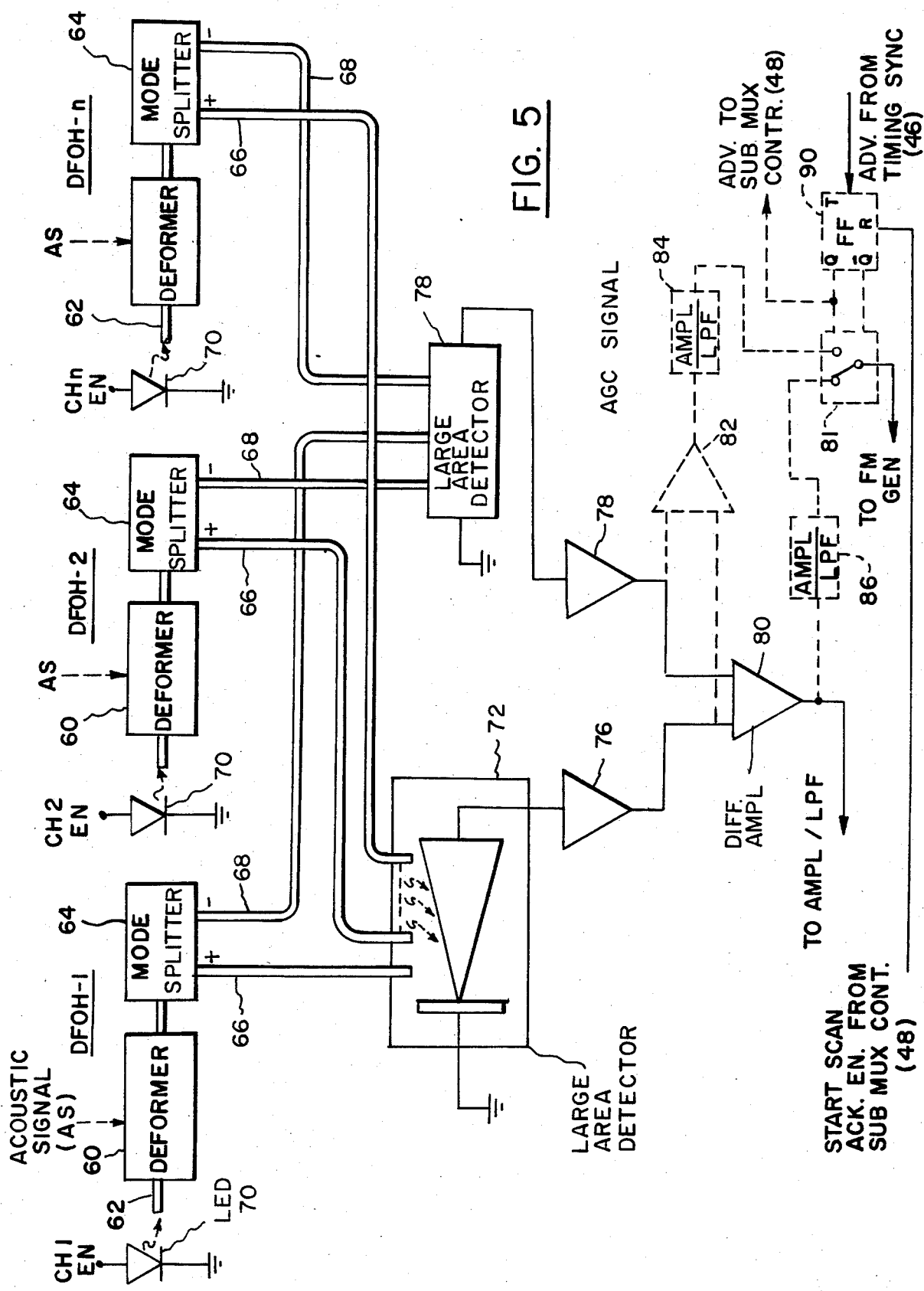

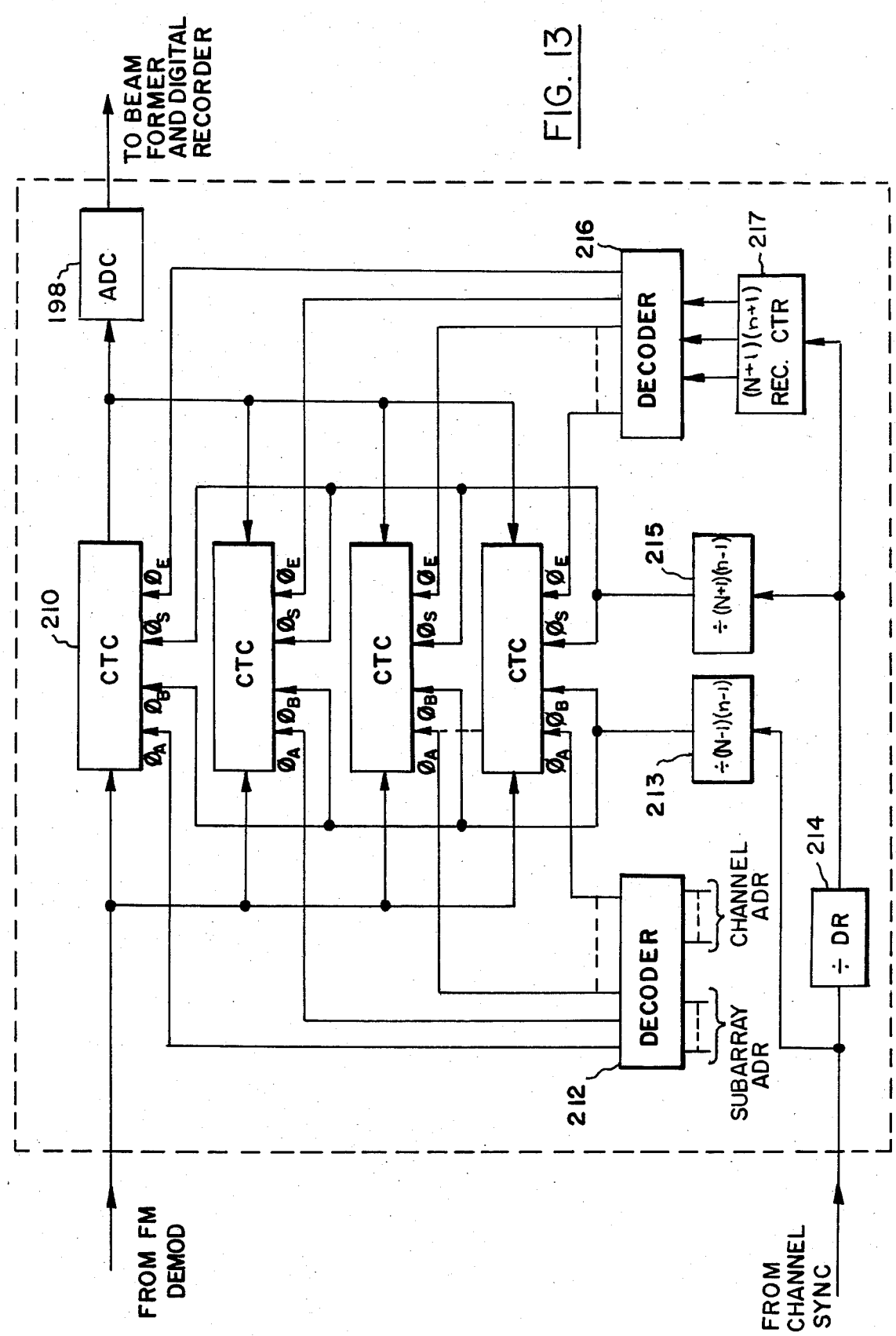

SENSOR SYSTEM WITH TIME DIVISION MULTIPLEXING TELEMETRY

The present invention relates to sensor systems wherein data is acquired and transmitted in time division multiplexed relationship, and particularly to methods and apparatus for acquisition of data from sensor arrays with time division multiplexing telemetry.

The invention is especially suitable for use in seismic systems and enables the use of optical sensors in seismic streamers or spreads having large numbers, for example many hundreds, of sensors. Features of the invention are and will be useful generally in data acquisition, both in the field of seismic signaling and communication of seismic data and other data, as in process control where the sensors may be responsive to temperature, pressure and other process parameters. The invention will find applications also in data acquisition and transmission from sensor arrays for sonar, terrain mapping underwater, and echo location purposes.

The large number of seismic sensors in seismic arrays, particularly seismic streamers for off-shore geophysical exploration, dictates the use of sample data communication systems for acquiring seismic data from the array. The acquisition and communication of signals from several sources thereof, such as the seismic sensors of seismic arrays, is known as telemetry. Time division telemetry wherein each sensor is assigned a particular time slot in repeated scans of the array has been proposed as a means for acquiring seismic data from the array. Reference may be had to the following United States patents which describe various aspects of time division telemetry of seismic signals: U.S. Pat. Nos. 3,851,302 of Nov. 26, 1974; 3,911,226 of Oct. 7, 1975; 3,990,036 of Nov. 2, 1976; 3,996,553 of Dec. 7, 1976; 4,005,273 of Jan. 25, 1977; 4,072,923 of Feb. 7, 1978; 4,092,629 of May 30, 1978; 4,117,448 of Sept. 26, 1978; and 4,218,767 of Aug. 19, 1980. Such systems trade off hardware complexity to achieve satisfactory seismic data acquisition in order to overcome noise and timing errors in the telemetry process. Two such hardware items which have been employed in previously known systems are anti-aliasing filters, one for each sensor in the array and sample and hold circuits. Because of the very high data rates (bit rates) involved in the transmission of seismic data (20 megabits per second for large arrays), sampling rates have been held to one KHz. This requires accurate low pass anti-aliasing filters with cut-offs below five hundred Hz to avoid the introduction of unfilterable aliasing distortion or noise into the seismic data acquired from the array. The anti-aliasing filters must be carefully matched for all channels in order to avoid introduction of phase errors. This of course presents problems of design as well as maintenance in the field. Numerous sample and hold circuits have been used in presently known time division seismic telemetry systems in order to overcome timing uncertainty (which is up to plus or minus one half millisecond at one KHz sampling rate) by sampling, then holding, and then digitizing the held samples under the control of stable crystal clocks. The timing errors are thereby reduced, but at the expense of hardware complexity.

The noise and timing problems in acquisition of seismic data are exacerbated when optical seismic sensors linked to an optical (fiber optic) transmission line make up the array (e.g., a linear array or streamer containing optical hydrophones). Reference may be had to U.S. patent application Ser. No. 74,268, filed in the names of David E. Nelson and John V. Bouyoucos on Nov. 11, 1979, now U.S. Pat. No. 4,313,192, and the references cited therein for more information concerning optical hydrophones, optical hydrophone arrays and the acquisition of data therefrom. Insofar as noise problems are concerned, there is a loss in power of three dB for each hydrophone which is connected to the same fiber optic transmission line even if the signals from the hydrophones are time division multiplexed on the line (see D. H. McMahon, J. Opt. Soc. Am., 65, 1479, (1975) and A. R. Nelson, et al, Appl. Opt., 19, 2917, (1980). For a five hundred channel optical streamer the minimum excess loss is 27 dB. In addition losses at fiber optic connectors in the main transmission line are significant and may reach approximately one dB per connection. For a streamer with fifty sections, the hydrophones in the section furthest from the towing ship would suffer an excess loss from 15 to 50 dB. These excess losses are over and above other losses in the system and are due only to the fiber optics couplings and connectors involved.

When the array is optically sampled, the noise problem is further exacerbated by shot or photon noise. In the time domain, the uncertainty in the level being measured as a result of photon or shot noise is proportional to the square root of the number of photons involved in the measurement. In conventional time division multiplexing techniques, as the number of channels being multiplexed goes up, the fraction of time in each scan which is devoted to each channel decreases inversely with the number of channels. For seismic streamers with hundreds of channels and array sampling rates (the rate at which each channel is sampled) being restricted in lower limit to avoid aliasing noise and to achieve required signal band width, photon or shot noise is a significant factor and will cause a signal to noise ratio degradation for a system of 10 log n, where n is the number of channels. For a large system with 500 channels, the degradation is 27 dB.

At present it is impossible to apply conventional signal processing techniques in a purely optical system, since the required optical processing elements such as anti-aliasing filters and sample and hold circuits are beyond the state of the art. Sampling at higher rates poses alternative problems. The shorter array sampling times would increase the photon or shot noise. The data rates on the transmission line of the array also begin to approach the band width limitations of the lines and the capability of circuits for receiving and demultiplexing the data.

It is a feature of this invention to permit the use of much higher (even an order of magnitude higher) sampling rates than in the case of conventional seismic arrays. Such oversampling reduces timing errors and makes possible the elimination of sample and hold circuits and anti-aliasing filters in the array.

Accordingly, it is the object of this invention to improve the methods for data acquisition with large sensor arrays and to provide improved sensor arrays wherein data is effectively and efficiently acquired.

It is a principal object of the present invention to provide an improved seismic system which has an array of seismic sensors and an improved method of telemetering seismic signals from such an array wherein noise and timing errors which affect the acquisition of seismic data from the array are minimized, all without hardware complexity.

It is another object of the present invention to provide an improved optical seismic sensor system having an array of optical seismic sensors which may be linked by optical transmission lines, such as optical hydrophones in a streamer, and an improved method of telemetering seismic signals from the array wherein noise contributed by optical effects, couplings and connectors, and timing errors in the sampling and transmission of seismic signals from the sensors in the array are minimized.

It is a further object of the invention to provide an improved system for and method of time division multiplexing of seismic signals such that rapid scanning and sampling rates may be used in order to decrease timing errors as well as aliasing noise without exceeding the band width capabilities of the transmission system.

It is a still further object of the invention to provide an improved system for and method of telemetering seismic signals from a linear array or streamer wherein synchronization is controlled from the tail end of the array and synchronization and data signals from the seismic sensors of the array propagate from the tail to head end of the array and in which timing errors may readily be detected.

It is a still further object of the present invention to provide an improved system for and method of telemetering seismic signals in analog samples or pulses which may be frequency encoded so as to reduce distortion and noise during transmission, as may be caused by non-linearities in the transmission line and/or components associated therewith.

It is a further object of the present invention to provide an improved method of and system for telemetering signals from an array of sensors by time division multiplexing of samples thereof in analog form thereby enabling scanning and sampling of the array at a high rate using smaller transmission band widths than would be needed for the transmission of digitized data at such high rates.

It is a still further object of the present invention to provide an improved seismic system having a large array of seismic sensors disposed in successive substantially identical sections and an improved method of telemetering seismic signals from the array in which the size of the array may readily be changed by changing the number of sections thereof without need for other modifications.

It is a still further object of the present invention to provide an improved sensor system having an array of sensors and an improved method of telemetering signals from the array by time division multiplexing and demultiplexing wherein timing of multiplexing and demultiplexing operations is carried on under the control of timing and data signals which are transmitted along the array.

It is a still further object of the present invention to provide an improved seismic system having an array of seismic sensors and an improved method of telemetering seismic signals from the array wherein time division multiplexing of the signals is accomplished in a manner to maximize the signal to noise ratio of the signals without hardware complexity.

It is a still further object of the present invention to provide an improved seismic system having an array of seismic sensors with an improved method of telemetering seismic signals from the array wherein signals are transmitted as FM bursts over a narrow modulation band width well within the transmission link capability.

The rate of deviation in frequency of the FM signals derived from successive sensor channels is thus reduced, thereby simplifying the design of FM modulators used in the system.

It is a still further object of the present invention to provide an improved seismic system having an array of sensors and an improved method of sampling and telemetering signals from the array wherein aliased noise from the sensors, such as Johnson noise in the case of electrostrictive sensors and additionally photon or shot noise in the case of optical sensors, is reduced, and which affords such noise reduction while allowing oversampling of the array at rates which can be approximately an order of magnitude higher than the Nyquist rate for the highest frequency component of interest in the seismic signals.

It is a still further object of the present invention to provide an improved seismic system having an array including a large number (several hundred) individual or groups of parallel connected seismic sensors in which the above described problems which confront the designer of such systems are substantially obviated.

Briefly described, a system embodying the invention is operative to telemeter signals, which may contain seismic data from an array of acousic sensors, which in a seismic system operate as seismic sensors. The sensors are arranged in a plurality of subarrays, each of which subarray has a plurality of sensors. The signals from the sensors are time division multiplexed into successive sweeps or groups of successive second samples. These samples may be frequency modulated analog signals. Each of the second signals in each sweep is derived from a different one of the subarrays of sensors. In the derivation of these sweeps, the outputs from each sensor in each subarray are submultiplexed into first samples in successive first time slots. These time slots are equal in number to the number of subarrays in the array. Then the first samples are multiplexed during successive second time slots which are shorter than the first time slots. This second stage of multiplexing is carried out at the end of each of a consecutive one of the first time slots. This provides the successive sweeps or groups of second samples where each second sample in each successive group or sweep is from a different one of the subarrays of sensors. Inasmuch as the submultiplexing is carried out during longer time slots, noise such as photon or shot noise from optical sensors, or Johnson noise from electrostrictive sensors, may be reduced by averaging the sensor signals during the longer time slot interval. Since the shorter second time slots contain the seismic data, they may reoccur at a rapid rate so as to enable the array to be oversampled (sampled at greater than the Nyquist rate). Such oversampling controls timing errors and reduces aliasing noise and distortion, even without the use of anti-aliasing filters at the output of each hydrophone and without the need for sampling and holding samples from the sensors during the sampling process.

The foregoing and other objects, features and advantages of the invention as well as the presently preferred embodiments thereof and the best mode now known for practicing the invention, will become more apparent from a reading of the following description in connection with the accompanying drawings in which:

FIG. 2 is a diagram illustrating the seismic system of the invention deployed as a streamer for underwater geophysical exploration purposes;

FIG. 4 is a partial block diagram illustrating a sub-multiplex controller which may be used in accordance with another embodiment of the invention employing electrostrictive rather than optical seismic sensors;

FIG. 5 is a block diagram illustrating a group of differential fiber optic hydrophones which may be used in the system shown in FIG. 3;

FIG. 13 is a block diagram illustrating a system of charge transfer devices which may be used to provide the demultiplexer filter and sampler (sample rate down converter) of the system shown in FIG. 11.

Figure 1:
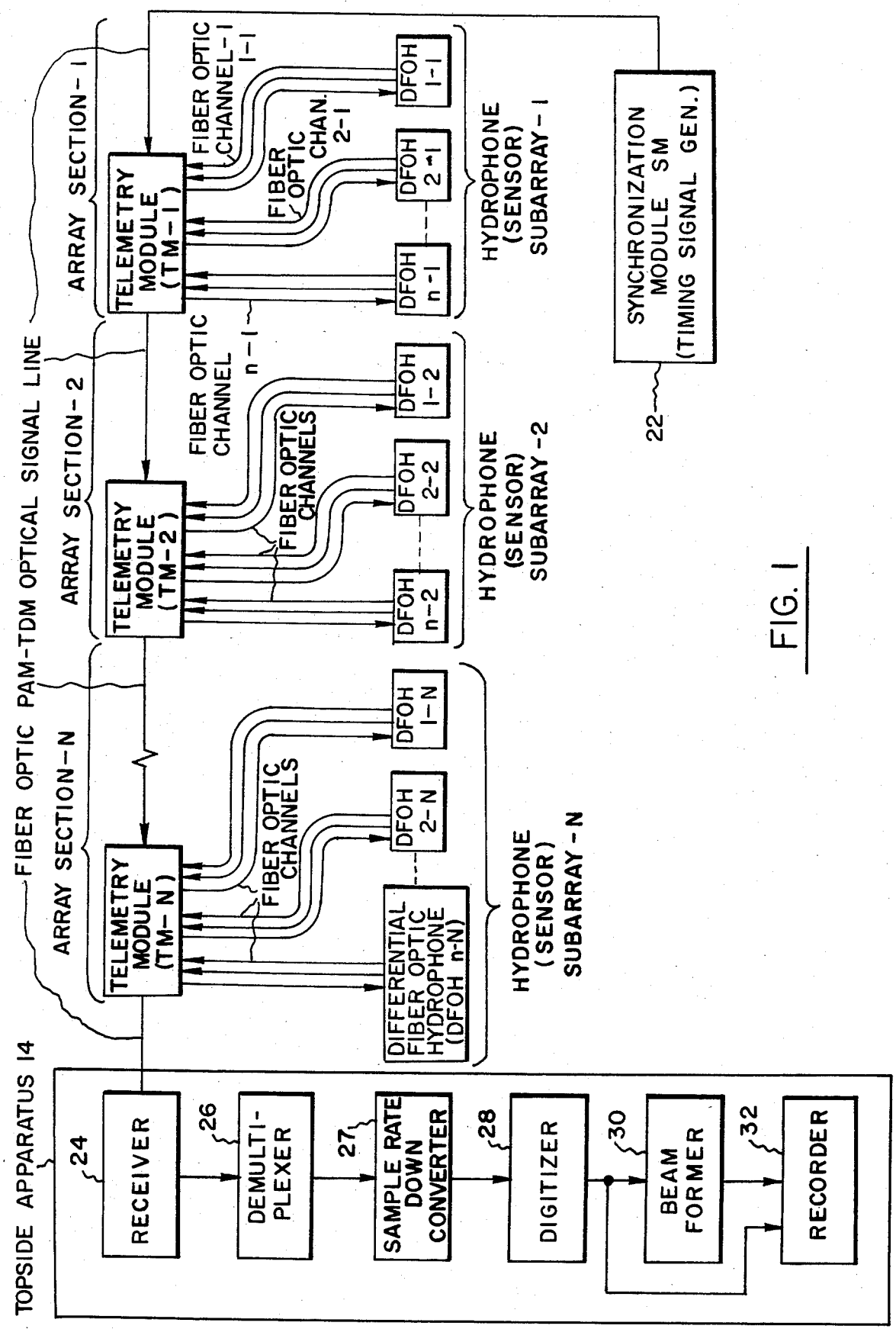
FIG. 1 is a diagram schematically illustrating a seismic system embodying the invention.

Referring to FIG. 1, there is shown an optical seismic system wherein the seismic signals are detected by optical hydrophones and are transmitted along the array from the tail end to the head end thereof along optical fiber transmission lines. Sonar and other acoustic signalling and location systems may be designed in a manner similar to the herein illustrated seismic system; seismic signals being a type of acoustic signal. The system is especially adapted for use in a linear array contained in a seismic streamer as shown in FIG. 2. The system is then made up of the array 10 which is contained in the streamer 12 (FIG. 2), and top side apparatus 14 at the head end of the array. The top side apparatus 14 is carried in the towing vessel 16. The towing cable 18 contains the portion of the fiber optic transmission lines between the array 10 and the top side apparatus 14. Electrical power for the array electronics is also contained in the cable. A drogue 20 at the far end of the streamer is used to guide the streamer to keep it along a linear or straight path as it is towed through the water. It will be appreciated that the invention may also be used with the sensor arrays or spreads on land where the seismic sensors are called geophones rather than hydrophones. In either case, only a single fiber optic transmission line, which may be in the interest of reliability a redundant group, for example of 3 lines, are used to carry the seismic signals which are telemetered from the array to the top side apparatus. Telemetering is accomplished by time division multiplexing of the seismic signals onto the line.

The seismic sensors which are preferably used in the array 10 are differential fiber optic hydrophones (DFOH) which are of the type described in the above-referenced Nelson and Bouyoucos patent application and in Nelson and Bouyoucos Pat. No. 4,294,513 issued Oct. 13, 1981. These hydrophones operate by changing the modes of propagation of light from a source of illumination through a sensing optical fiber which is deformed in accordance with the acoustic signal incident on the hydrophone. There is differential light modulation from the different modes which may be transmitted along fiber optic channels to detectors which provide an electrical output representing the seismic signal which is detected. These hydrophones have a wide dynamic range and low noise operation. An improved version of the DFOH which is presently preferred for use in the array is described in U.S. patent application Ser. No. 240,634 filed Mar. 5, 1981 in the names of David M. Berg and Kenneth J. Teegarden, now U.S. Pat. No. 4,381,137, issued Apr. 26, 1983.

The array 10 has N subarrays of differential fiber optic hydrophones. Each of these subarrays may have n sensors therein. Each of these sensors may be a plurality, say three, hydrophones which effectively operate in parallel and are spaced close to each other in the streamer so as to respond to acoustic signals which are effectively incident over a larger area than can be covered by a single hydrophone. Since the plurality of hydrophones is sampled simultaneously and their outputs combined in parallel, they may be considered as a single hydrophone for purposes of explaining the telemetering of the seismic signals from the array. Accordingly, it will be understood that when one hydrophone is referred to, it may be taken to be a spread or group of hydrophones which are effectively connected in parallel.

Each subarray of hydrophones is associated with a telemetry module to provide a separate array section. Accordingly, array section 1 at the tail end of the array includes TM1, the first telemetry module, and subarray 1 of hydrophones together with a fiber optic signal transmission line. A synchronization module 22, which contains a timing signal generator, transmits sync pulses from the tail end of the line along the array. In the first telemetry module, acknowledgment pulses are generated upon receipt of the synchronization pulses and seismic data pulses are added after sweep synchronization signals. In short, the telemetry module submultiplexes the seismic signals from the hydrophones in the subarray and transmits them in time relationship with the synchronization signals to the next array section.

The next array section contains the second telemetry module TM2 which is connected to the first telemetry module TM1 by another fiber optic link. The second telemetry module submultiplexes the seismic signals from the hydrophones in subarray 2, after acknowledging the scan synchronizing signal, and transmits the synchronizing signals and the seismic data signals onto the next section of the array. The final or Nth section of the array includes another fiber optic transmission link, the last telemetry module TMN and the last or Nth subarray of hydrophones. The pattern or time relationship of the seismic signals and the synchronizing signals will be explained in greater detail hereinafter. It will be noted that both the synchronizing signals and the data signals propagate in the same direction thereby avoiding two-way propagation delays. The signals are forwarded between the telemetry modules from the tail end to the head end of the array and onto the top side apparatus 14.

Briefly, data signals from one hydrophone in each subarray are multiplexed in successive sweeps, such that after n sweeps, a scan of the array is completed and a sample of the signal detected as each hydrophone is transmitted. These scans are, in accordance with the invention, repetitive at a rate which may be an order of magnitude higher than the Nyquist rate for the highest frequency component of interest in the seismic signal. This frequency component may, for example, be 500 Hz. The Nyquist rate is then one KHz. The scan rate at which each hydrophone is sent may suitably be 10 KHz. This oversampling improves the noise and timing error performance of the system. Typically, there may be 10 to 20 hydrophones in each subarray of hydrophones (e.g., n is from 10 to 20). There may be 50 such subarrays, in which case N is 50. In a typical system where n is 10 and N is 50, 500 hydrophones are used in the array. With the sampling or scan rate of 10 KHz the seismic signal transmission rate is approximately 5 MHz.

The seismic signals multiplexed on the line are translated into electrical form in a receiver 24 which may include a detector or discriminator in the case where the signal samples are FM signals, which is preferred as will be discussed more fully below. The signals are then demultiplexed and filtered so as to restore them to continuous analog form. The demultiplexer and associated filters also provide for removal of noise components which are of frequencies above the highest seismic signal frequency component of interest. The receiver derives timing signals from the synchronizing signals which are transmitted with the data and uses these signals to control the demultiplexer 26. Since the seismic signals have been oversampled and subsequently filtered, it is now possible to reduce their sampling rate by a data decimation process. A sample rate down converter 27 serves this purpose and provides a serial stream of samples at a lower rate, say one KHz, from each of the n×N channels of the array. These samples may be digitized into multibit digital signals by a digitizer 28 of conventional design.

The digitized signals may be applied to a beam former 30 so as to provide a train of output digital signals, which corresponds to the reception of seismic energy within selected beam patterns, by collecting data from selected hydrophones in the array. These data may be recorded on a digital tape recorder 32. The serial stream of digitized seismic signals may also be recorded together with address information which represents the location in the array of the sensors producing the signals. The beam former and recorder may be of the type conventionally used in seismic signal processing. The data which is recorded can then be processed under computer control in order to derive seismograms representing the subsurface formations which are scanned by the array.

The vessel 16 may include seismic sources such as air guns or hydraulically operated implosive devices which generate pulses of seismic energy that penetrate the water and the ground and are reflected and picked up by the hydrophones.

The streamer 12 (FIG. 2) has the array sections disposed consecutively with the hydrophones in each subarray spread linearly with equal spacings from each other along the length of the streamer 12. Suitable jackets may be disposed around each array section. These may be filled with liquid to adjust the bouyancy thereof.

It is a feature of the invention that these sections may be connected together exclusively by electrical couplers. Mechanical connections are, of course, used between the sections so that the entire streamer may be towed as a unit. Accordingly, there are no connector losses along the fiber optic transmission line which is made up of the fiber optic line in each section. In addition, there are no coupler losses in the fiber optic channels from the optical hydrophones to the line. A hybrid arrangement is used, as is described more fully in connection with FIGS. 3 and 7, whereby electrical connections are used between the array sections while transmission and collection of the seismic signals is by optical means, particularly fiber optics.

Figure 3:
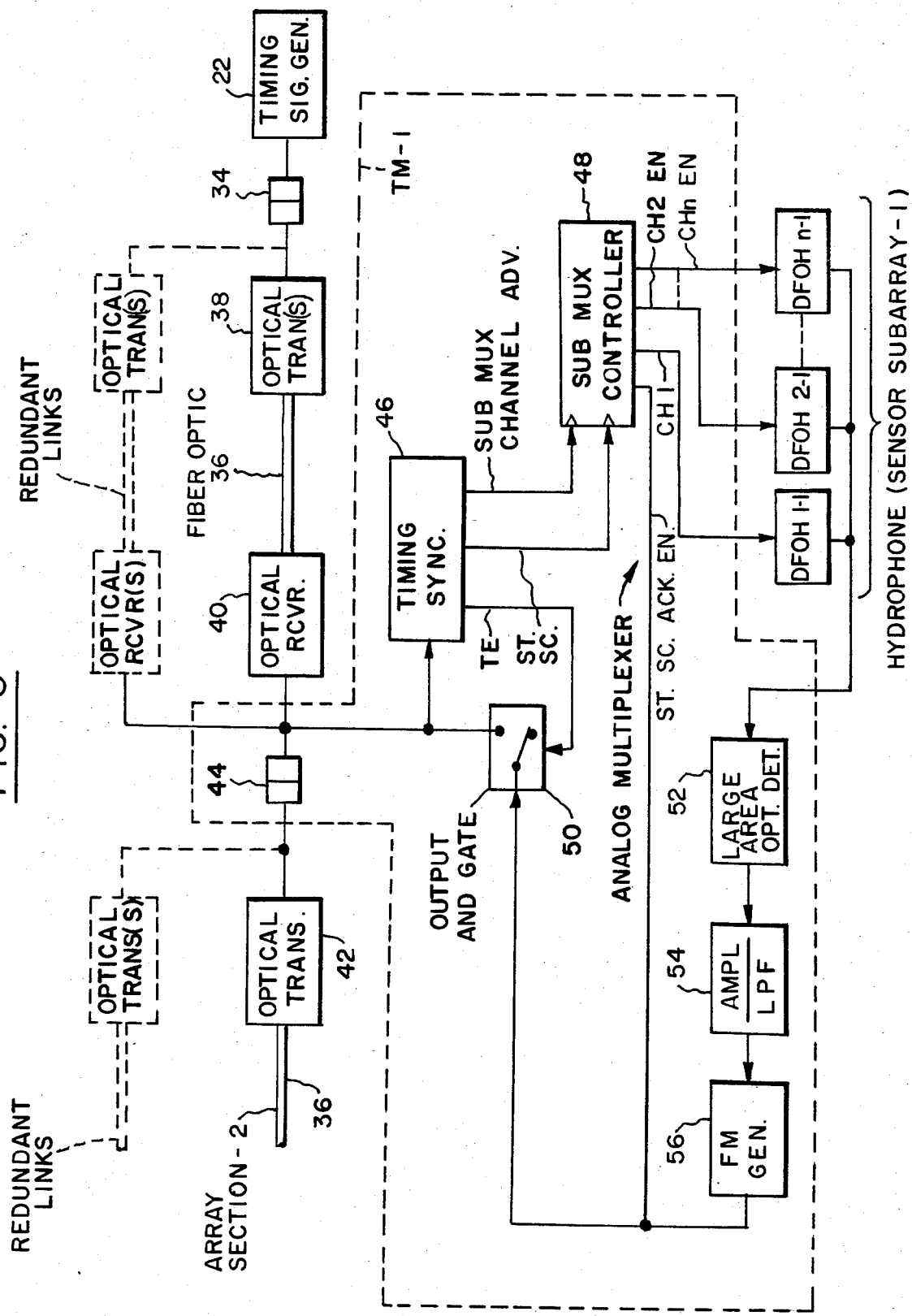
FIG. 3 is a block diagram showing one section of the array of the seismic system of FIG. 1 and the components associated therewith, in greater detail.

Referring next to FIG. 3, array section 1 is shown together with a portion of array section 2. The input to the array is from the synchronization module 22 and the timing signal generator thereof. There is an electrical connection through a connector 34 to the first array section. Signals are transmitted optically through this section by a fiber optic transmission line 36 which is interfaced at the tail end of the line with the timing signal generator by an optical transmitter 38. An optical receiver 40 interfaces the line 36 with the next section. The receiver also provides an interface with the telemetry module TM1. The next section (array section-2) has its own optical transmitter 42 at the tail end thereof. Each succeeding section is interfaced at the tail and head ends thereof, similarly with the first array section, by optical transmitters and receivers. A plurality of redundant links including fiber optic lines with optical transmitters and receivers at the tail and head ends thereof may be paralleled with the single fiber optic transmission line for increased reliability. Such construction, although not necessary, is preferred.

The successive array sections are electrically connected by electrical connectors, of which the connector 44 between the first and second array sections is typical. The telemetry module for the first array section and for each succeeding array section may be connected to the output of the optical receiver 40 of the transmission line link. Each array section may be identical so that the length of the array may be changed simply by disconnecting or connecting additional array sections at the electrical connectors 44.

The telemetry module serves to generate sync acknowledgment pulses and data signals in time relationship with the scan sync and sweep sync signals from the timing signal generator and also with other sync acknowledgment and data signals from preceding array sections as they are relayed along the array. Each pair of interfacing components, optical receiver 40 and transmitter 42, operates as a repeater of sync and data signals. In the telemetry module, the timing synchronizer 46 responds to the scan and sweep sync signals and generates start scan, submultiplex channel advance and transmit enable (TE) pulses. The start scan and submultiplex channel advance pulses control a submultiplex controller 48. The controller 48 generates a start scan acknowledge enable level in proper time relationship with the scan sync and any sync acknowledgment pulses which are transmitted along the array, such that its own sync acknowledgment pulse is generated by gating the acknowledge enable level in an output electronic switch 50. The switch 50 is operated by the TE pulse so that the sync acknowledgment pulse is transmitted in proper time relationship with other sync acknowledgment pulses and is of like width or duration. The switch 50 can be an AND gate.

The submultiplex controller 48 submultiplexes the optical hydrophones (DFOH-1 to -n) of the hydrophone subarray which is associated with the section of the array, such that the seismic signals therefrom are available in proper time relationship to be used to form groups of seismic signals in each sweep. The seismic signals in each group come from the corresponding hydrophone in the subarray of each successive array section. The submultiplexing is under the control of submultiplex channel advance pulses. These pulses recur approximately at the same rate as the sweep sync signals and permit the controller to enable the hydrophones for a longer period of time than the duration of a data signal.

It is an important feature of this invention, which contributes to the low noise and high signal to noise ratio operation of the system, that the sensors are enabled and provide seismic signals to the telemetry modules for a longer time than the durations of the data signals which are transmitted along the array. This permits a higher sampling rate such that each seismic sensor or hydrophone is oversampled, but not at the expense of increasing the noise due to the time division multiplex process. This is especially important in the case of optical sensors, such as fiber optic hydrophones, since they are subject to photon or shot noise.

The longer the sampling time of the hydrophone, the more signal is collected in proportion to the noise. For time division multiplexing, the signal to noise degradation is proportional to 10 log c where c is the number of channels or sensors involved in the given multiplex stage, considering that each channel is sampled for a like period of time. By effectively reducing the number of channels involved in each multiplex stage, and thus increasing the period of time available to multiplex each channel, the signal to noise ratio is greatly improved. In the illustrated embodiment of the invention where the total number of channels is the product of n and N (500 channels, for example), the n channels in each subarray are optically submultiplexed over approximately the same period of time as is used to multiplex all 500 channels. Thus, for example, where n is 10, the loss is only 10 db in signal to noise ratio as compared to 27 db for all 500 channels in a single level optical multiplex system. This amounts to an improvement of 17 db in signal to noise ratio. This improvement is obtained without sacrificing the benefit of oversampling, for example, at a 10 KHz rate rather than a one KHz rate.

In the optical hydrophone, the enable signals from the submultiplex controller illuminate the hydrophones in sequence and enable them to provide optical outputs which vary in amplitude in accordance with the acoustic signals incident on the hydrophone. Since the enabling signals occur sequentially, the optical outputs presented by the output fibers of each of the n DFOH (differential fiber optic hydrophones) in the subarray are effectively time division multiplexed. A large area optical detector 52 provides an electrical output corresponding to said multiplexed signal. This electrical output is amplified and low pass filtered in an amplifier and low pass filter 54. The filter 54 has a cut-off frequency which will pass only frequency components approximately up to the submultiplex rate. In the case of a system running at 10 KHZ with ten hydrophones per subarray, the cut-off frequency will be about 100 KHZ.

This filter 54 effectively integrates over the submultiplex sample time thereby reducing the photon noise.

The seismic signals in analog form from the amplifier and low pass filter 54 are used to modulate a frequency modulation (FM) generator 56 which produces a train of pulses, the frequency or repetition rate of which varies in accordance with the amplitude of the seismic signals from the amplifier and filter 54. This form of modulation is generally known as Pulse Frequency Modulation or PFM. Since the modulating signals are amplified and filtered for the relatively long period of time that each hydrophone is enabled, the modulation bandwidth or rate of change of amplitude of the modulating signal may readily be accommodated by FM generators, such as voltage control oscillators, of conventional design. The FM signal is gated by the electronic switch 50 during the transmit enable period which are of relatively short duration (e.g. 100 nanoseconds) (ns). The transmission of such FM signals is well within the bandwidth constraints of the fiber optic transmission links 36 in the array sections. Far less bandwidth is required than would be the case for typical multibit (15 to 20 bit) digital signals for the same sampling rates.

In the event that electrostrictive hydrophones are used instead of optical hydrophones, their outputs H1 to Hn are amplified in amplifiers 58 and switched by an analog multiplexer switch 60 (see FIG. 4). This switch provides an output to the electronic switch 50 and to the amplifier and low pass filter 54. The multiplexer switch 60 is controlled by a counter 62 which is operated by the timing synchronizer 46 so as to function as the submultiplex controller. The hydrophones are effectively enabled through the multiplexer switch 60 for periods of time which are longer than the data transmission rate by a factor equal to the ratio of N to the product of n×N. Johnson noise (the thermal noise in the electrostrictive hydrophone and the inputs of the amplifiers associated therewith) has the same spectral qualities as photon noise in the case of optical sensors and is reduced in proportion to the signal collected in an analogous manner. The signal to noise ratio is therefore enhanced also in the case where electrostrictive sensors or hydrophones are used in the system.

Referring to FIG. 5, the subarray of optical hydrophones DFOH-1 through DFOH-n are shown in greater detail. The hydrophones themselves, of which DFOH-1 is typical, consist of a deformer or microbender 60 which bends an optical fiber 62 passing therethrough in accordance with the acoustic signal pressure which is applied to a diaphragm thereof. Differential operation is obtained by a mode splitter 64 which segregates the lower and higher order core modes or core and clad modes and provides differential outputs on separate optical fibers 66 and 68. Thus a hydrophone channel is a pair of differential outputs provided from the DFOH.

The enable signal (CH1EN) applies operating current to a light emitting diode 70 which is injected into the input end of the fiber 62. It is only when the enable signal is on that the hydrophone is activated and can produce an output on the channel provided by the output fibers 66 and 68.

As each enable signal CH1EN, CH2EN, . . . , CHnEN is applied successively to the light emitting diodes of the hydrophones, DFOH-1, DFOH-2, . . . DFOH-n, they are successively enabled. The output seismic signals in optical form are provided in time multiplex relationship. This is a submultiplexing process, since the optical signals are again sampled at the output electronic switch 50 (FIG. 3) after they have been converted into frequency modulated electrical signals. This two stage sampling makes it possible to eliminate anti-aliasing filters and sample and hold circuits in the array and permits oversampling rates, higher than the Nyquist rate for the highest frequency component in the seismic signals which is of interest, to be used. Timing errors, as synchronization and data signals propagate along the array, are therefore minimized.

The lower order core are detected and converted into corresponding electrical signals by a large area detector 72. The lower order core mode output fibers 66 are held together in an assemblage so that light therefrom is incident on a photodiode or diodes having a large light receptor area. The photodiodes in the large area detector 72 may be PIN or avalanche photodiodes. Large area detectors of other designs may be used (see, for example, U.S. Pat. Nos. 4,107,518 and 4,234,968). Another large area detector 74 similar to the detector 72 is used to translate the light emanating from the ends of the higher order core mode or clad mode fibers 68 of the hydrophones into an electrical output corresponding thereto. Transimpedance amplifiers 76 and 78 apply the electrical signal outputs from the detectors 72 and 74 to a difference amplifier 80 which provides the multiplexed output of the hydrophone subarray to the amplifier and low pass filter 54. It will be seen that both large area detectors constitute the large area optical detector 52 and function as generally described in connection with FIG. 3.

The differential fiber optic hydrophones are preferably of the type described in the above-identified application filed in the names of Berg and Teegarden (Ser. No. 240,634). The transimpedance amplifiers 76 and 78 are desirably used since their input impedance is very low and they respond linearaly to the current output of the photo diode. The cancellation of common mode noise signals in the differential amplifier 80 then prevents spurious outputs from being applied to the amplifier and low pass filter 54.

Optionally, as indicated in FIG. 5 by the circuit elements and connections shown in dash lines, normalization signals may be derived by transmitting a sum signal obtained by a summing amplifier 82 from both the differential output of the hydrophones. The inputs to this summing amplifier 80 are connected to the outputs of the amplifiers 76 and 78. The sum output is passed through an amplifier and low pass filter 84. Successive pulses are obtained during the earlier and later parts of the sampling periods for each hydrophone (while the channel enable signal thereto is on) by switching alternately between the output of the sum signal amplifier and low pass filter 84 and the output of a difference signal amplifier and low pass filter 86. This filter 86 is then used in lieu of the amplifier and low pass filter 54. The amplifier and low pass filter 86 may be identical to the amplifier and low pass filter 54.

A sum output and a differential output are provided to the FM generator on two successive sweeps, under the control of the triggerable flip-flop 90 and electronic switch 81. The flip-flop 90 is reset by the start scan acknowledge enable line from the submultiplex controller 48 (FIG. 3), then set by the following submultiplex channel advance. Thus, on the first subsequent sweep, the sum signal is provided to the FM generator and transmitted up the array. Following this transmission, the next channel advance resets the flip-flop so that the differential signal is provided to the FM generator. The channel enable is not advanced. On the second sweep, the differential signal is sampled and transmitted up the array.

It will be noted that this system requires twice as many sweeps to scan the complete array, thus a data transmission rate twice as high as previously discussed is required to maintain the same channel sampling rate. However, since the differential output is now derived over two array sweep period, the amplifier and filter 86 can be identical to the amplifier and filter 54, and no loss of signal to noise ratio is experienced.

Figure 6:
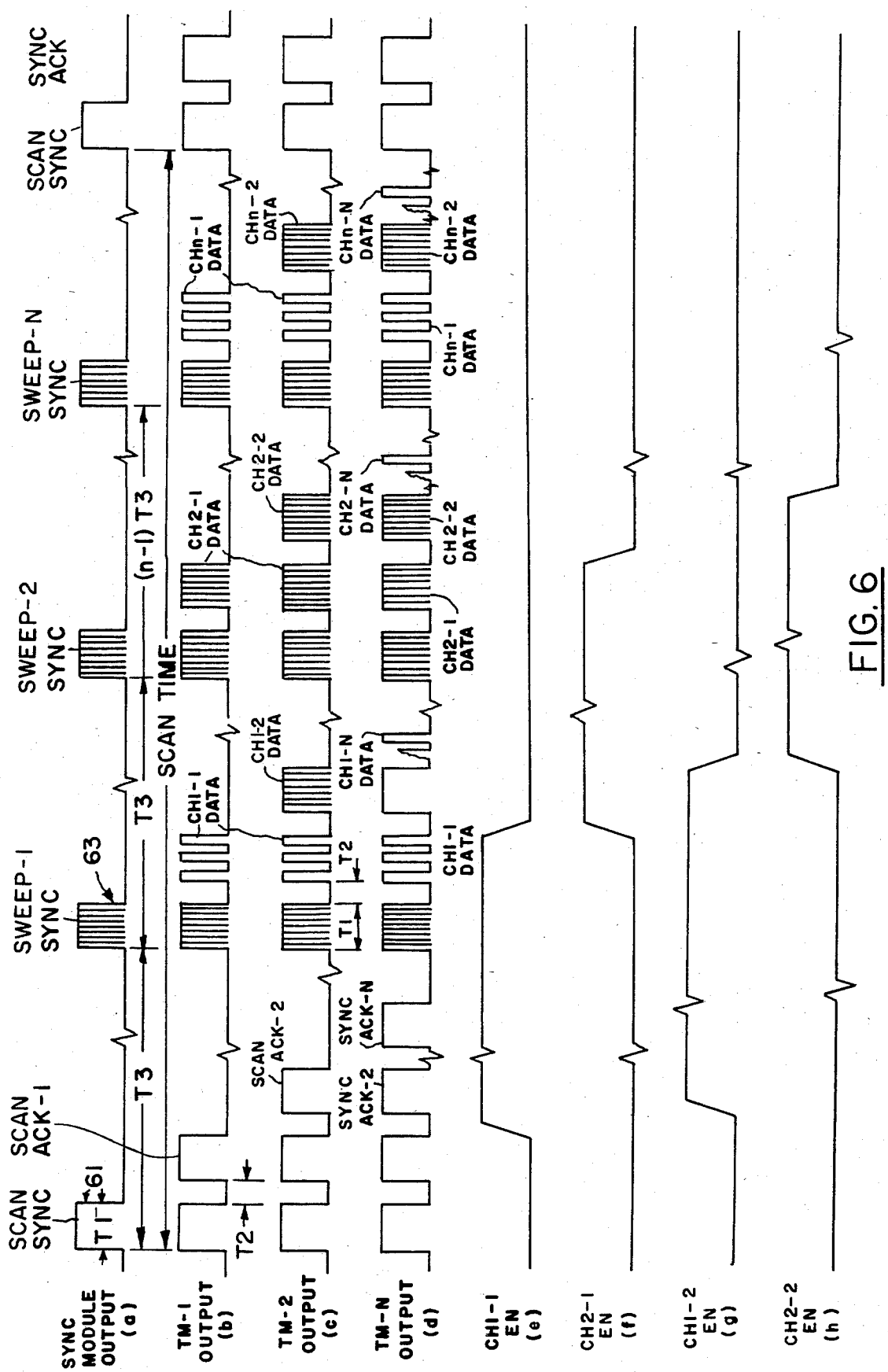
FIG. 6 is a timing diagram which illustrates how the seismic signals are telemetered in accordance with the invention.

The time slots in which the synchronization and data signals occur and the time slots in which the data signals are submultiplexed and again multiplexed in the course of the two-stage sampling of the sensor outputs is shown in FIG. 6. FIG. 6 shows the wave forms of the optical signals as they appear at various positions along the array. The top most wave form (a) represents the signal from the synchronization module as it is applied to the telemetry module TM1 in array section 1. The second wave form (b) represents the signal propagating along the transmission link in array section 2 (in the fiber optic line between TM1 and TM2). The next wave form (c) represents the signal in the fiber optic line of the third array section (between the second and third telemetry modules). The fourth wave form (d) represents the signal coming from the last telemetry module TM-N into the top side apparatus 14 (FIG. 1). Wave form (e) represents the enabling current level to the first hydrophone in the first subarray and is marked as a CH1-1EN or channel 1 hydrophone subarray 1 enable. The enabling current to the second hydrophone of the first subarray (CH2-1EN) is shown in wave form (f). Wave form (g) shows the wave form of the enabling current to the first hydrophone in the second subarray of hydrophones (i.e., CH1-2EN). The wave form of the enabling current CH2-2EN to the second hydrophone in the second subarray is shown in wave form (h).

The scan sync pulse generated by the timing generator in the synchronization module is a square wave which repeats at the system scanning rate. The width of the pulse is the duration of a time slot less a guard time. The pulse width is indicated as T1. The guard time is T2. For example, in a 500 channel system, where the sampling rate is 10 KHz, T1 may be 100 nanoseconds (ns). The guard time T2 may suitably be 10 ns. It will be noted that for seismic signals where the highest frequency component of interest may be 500 Hz, such that the Nyquist rate is one KHz, a 10 KHz sampling rate represents oversampling by an order of magnitude (i.e., 10×the Nyquist rate).

The scan sync pulse is followed by n sweep sync pulses each in the form of a burst of pulses at the carrier frequency of the FM data signals. This center frequency in a 500 channel system with a 10 KHz sampling rate is suitably 150 MHz. With an FM carrier frequency of 150 MHz the frequency modulated pulses in the bursts (PFM signals) constituting data signals will not exceed the guard time, even when they are subject to a frequency deviation of 50 MHz, such that the pulses occur at 100 MHz rate. The transmission of pulses rather than sinursoidal signals for the sweep sync and data signals is preferred, since the increased slope of the pulse near an axis crossing increases the noise immunity with most forms of FM detectors. PFM is also more suitable for use with optical devices, such as semiconductor lasers, which are inherently non-linear.

The scan sync pulse and the first sweep sync signal (sweep-1 sync) are separated by a period of time T3. Subsequent sweep sync signals are separated by like periods T3. T3 is long enough to provide sufficient guard time between the scan sync and its trailing sync acknowledgment pulses and the trailing data pulses in each sweep or group of data signals, and the succeeding sweep or scan sync pulse. A suitable time duration or T3 may be $(N+1)\times(T1+T2)$ which is about six microseconds with T1 and T2 being 100 ns and 10 ns, respectively, and with 50 sections in the array (N=50). For a long array, T3 will be much less than the propagation time of signals from the tail end to the head end of the array. Thus, there will be several pulse trains propagating up the array simultaneously, at different positions along the array. It will be noted that all signals, both data and timing signals, propagate in only one direction. The operation of the system is therefore inherently independent of array length and propagation times.

As discussed above, each telemetry module responds to the received signals in the following sequence: All received signals are first directly retransmitted to the next array section without modification. After a trailing edge of the received signal has passed, and the optical receiver of the array section associated with the telemetry module becomes dark, the telemetry module transmits a pulse of duration T1. This pulse is either steady light in the case of an acknowledgment pulse or a PFM (pulse frequency modulated) data signal representing the seismic signal from a hydrophone channel. Thus, each telemetry module always transmits one more pulse than it receives after retransmitting all previous pulses.

After the scan sync pulse and after each sweep sync pulse there will at the output of the array (the TM-N output) be N signals. The number of sweep sync pulses depends upon the number of hydrophones in each subarray. In other words, there will be n sweep sync pulses and n sweeps to constitute a complete scan.

The scans are each preceded by a synchronizing or acknowledgment interval. Correct array operation can be verified by counting the acknowledgment pulses; the absence of N acknowledgment pulses after a sync scan pulse at the output of the array is an indication of an error or faulty operation condition and may be used to alert the operator of the system.

When the first scan sync pulse is received by TM-1 and the scan sync pulse is retransmitted by the optical transmitter and receiver at each array section interface, the start scan signal is generated by the timing synchronizer 46 (FIG. 3). It is used as a reset pulse as will be hereinafter explained. The telemetry module operates to generate and transmit the sync ack-1 acknowledgment pulse upon the expiration of the guard time T2 after the end of the sync scan pulse. As shown in wave form (c), when the scan sync and sync ack-1 pulses have been detected at TM-2, TM-2 generates the sync ack-2 pulse. This process continues up the array until all the telemetry modules have transmitted a sync-ack pulse. Thus, at the TM-N output there are N+1 pulses consisting of the scan sync pulse and sync ack-1 through sync ack-N pulses. The reception of this string of pulses at the top side apparatus 14 confirms that all of the telemetry modules have been synchronized and data signals may be properly transmitted up the array.

The sync acknowledgment pulses are current levels generated when the start scan acknowledgment level from the submultiplex controller 48 is switched or gated into the line between the interfacing optical receiver 40 and optical transmitter 42 (see FIG. 3). The transmit enable (TE) interval is the interval of duration T1 which occurs a time T2 after the end of the scan sync pulse in the case of TM1 or the end of a preceding sync ack pulse in the case of the succeeding TM's further up the array.

The transmission of an advance pulse from the timing synchronizer 46 in TM-1 follows the transmission of the sync ack-1 pulse and conditions the submultiplex controller 48 to generate the CH1-1EN level shown in wave form (e). DFOH-1 in hydrophone group 1 is then enabled and produces an optical output signal which is detected and processed to provide the PFM signal. This PFM signal is now sampled at the output electronic switch 50 upon occurrence of the next TE pulse from the timing synchronizer 46. The timing synchronizer's response to the sweep-1 sync signal generates the TE level for a duration T1, a time T2 after the end of the sweep-1 sync. Accordingly, at the end of the CH1-1EN level (see wave form (e) of FIG. 6) the TE pulse is generated and samples the PFM output from the FM generator 56 and transmits it as the CH1-1 data signal.

TM-2 operates similarly after the sweep-1 sync and CH1-1 data signal are transmitted to array section-3. At the TM2 output as shown in wave form (2) the PFM data signal from the channel 1 hydrophone in the second subarray of hydrophones, which is associated with the second section of the array, is transmitted. It will be observed from wave form (g) that the CH1-2EN enable signal to the first hydrophone in the second subarray overlaps the CH1-1EN signal. It will be noted that the durations of the overlapping enabling signals are approximately T3. The first stage of sampling of the hydrophones is therefore much longer than the second stage sampling of the signals from the FM generators. The photon, shot or Johnson noise performance sensor is improved by a factor related to the ratio to T3 to T1. It will be seen from wave form (c), (f) and (h) that a similar two-stage sampling process occurs for the first and second hydrophones in the first and second subarrays of hydrophones. Thus, the first scan consists of PFM samples of the outputs of the first hydrophone in each subarray which follow the sweep-1 sync signal; the second sweep consists of the second or sweep-2 sync signal and the PFM sample of the signals from the second hydrophone in each of the N subarrays of hydrophones. Finally, the last sweep consists of the sweep-n sync and the PFM samples from the nth hydrophones in each subarray of hydrophones.

Figure 10:
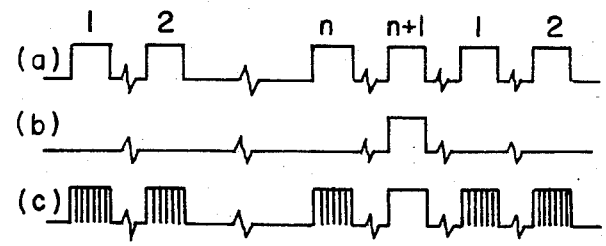
FIG. 10 are timing diagrams illustrating the operation of the timing signal generator shown in FIG. 9.
Figure 9:
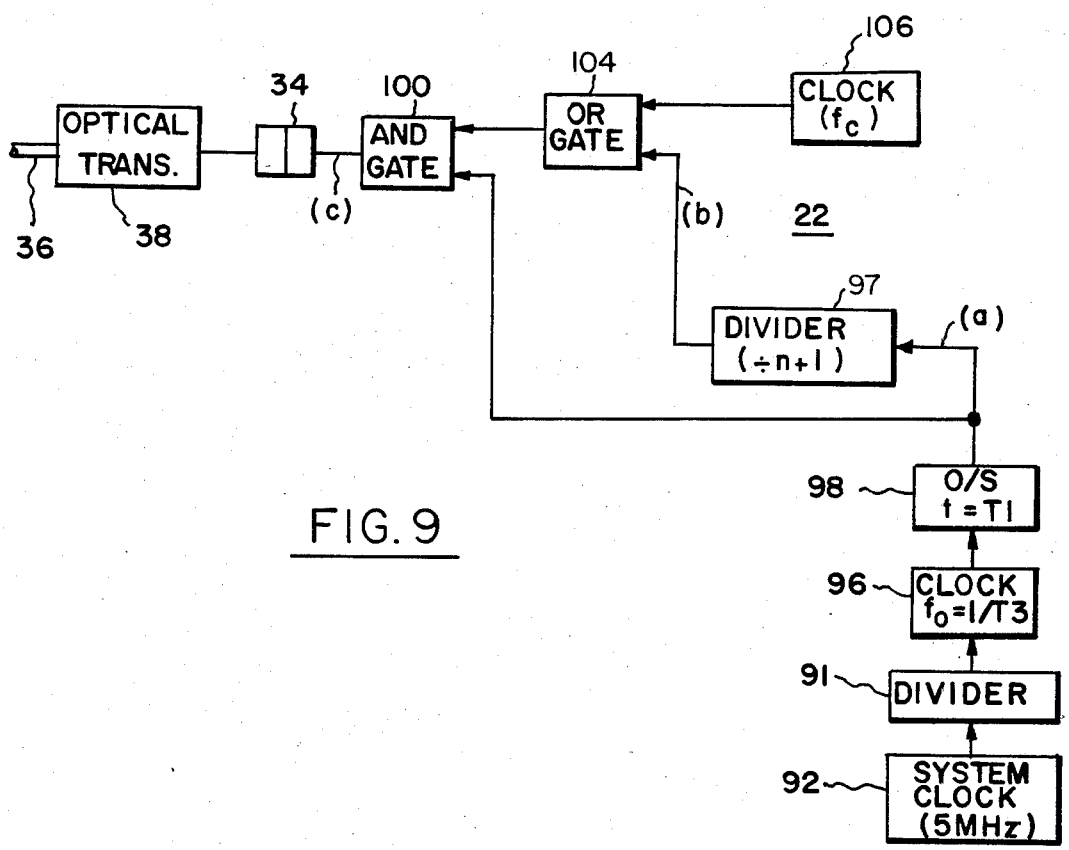
FIG. 9 is a block diagram illustrating the synchronization module (timing signal generator) of the systems shown in FIG. 1 and 3.

The timing signal generator circuitry in the synchronization module 22 is shown in FIG. 9. A stable system clock oscillator 92, which in the case of a seismic system having a 10 KHz sampling rate may produce square wave clock pulses at a 5 MHz rate, is connected to a divider 91 to synchronize a clock oscillator 96 operative at a frequency equal to the reciprocal of T3. Pulses of period T1 are obtained from a one shot circuit 98. These pulses are applied to AND gate 100. A train of these pulses marked 1, 2, --- n, n+1, 1, 2 --- is shown in wave form (a) of FIG. 10. n is the number of hydrophones in each subarray, as explained above.

This train of pulses is applied to a divider 97 which divides them by (n+1) such that only the (n+1)th pulse is applied to an OR gate 104. This n+1(th) pulse is shown in wave form (b) in FIG. 10. A clock oscillator provides a train of clock pulses at the FM carrier frequency ($f_c$) which as explained above, may be 150 MHz. The clock oscillator 106 pulses and every (n+1)th pulse from the clock 96 both pass through the OR gate 104. The AND gate is enabled upon occurrence of each pulse from the one shot 98. Accordingly, a pulse will be output by the AND gate 100 every (n+1)th pulse from the one shot 98 and bursts at the $f_c$ frequency of the clock 106 will be output all other clock pulse periods. This output train is shown in wave form (c) of FIG. 10. It will be observed that this train of pulses which are separated by intervals of T3 and consist of a square wave pulse followed by n bursts of high frequency pulses is the sync module output shown in wave form (a) of FIG. 6.

Figure 7:
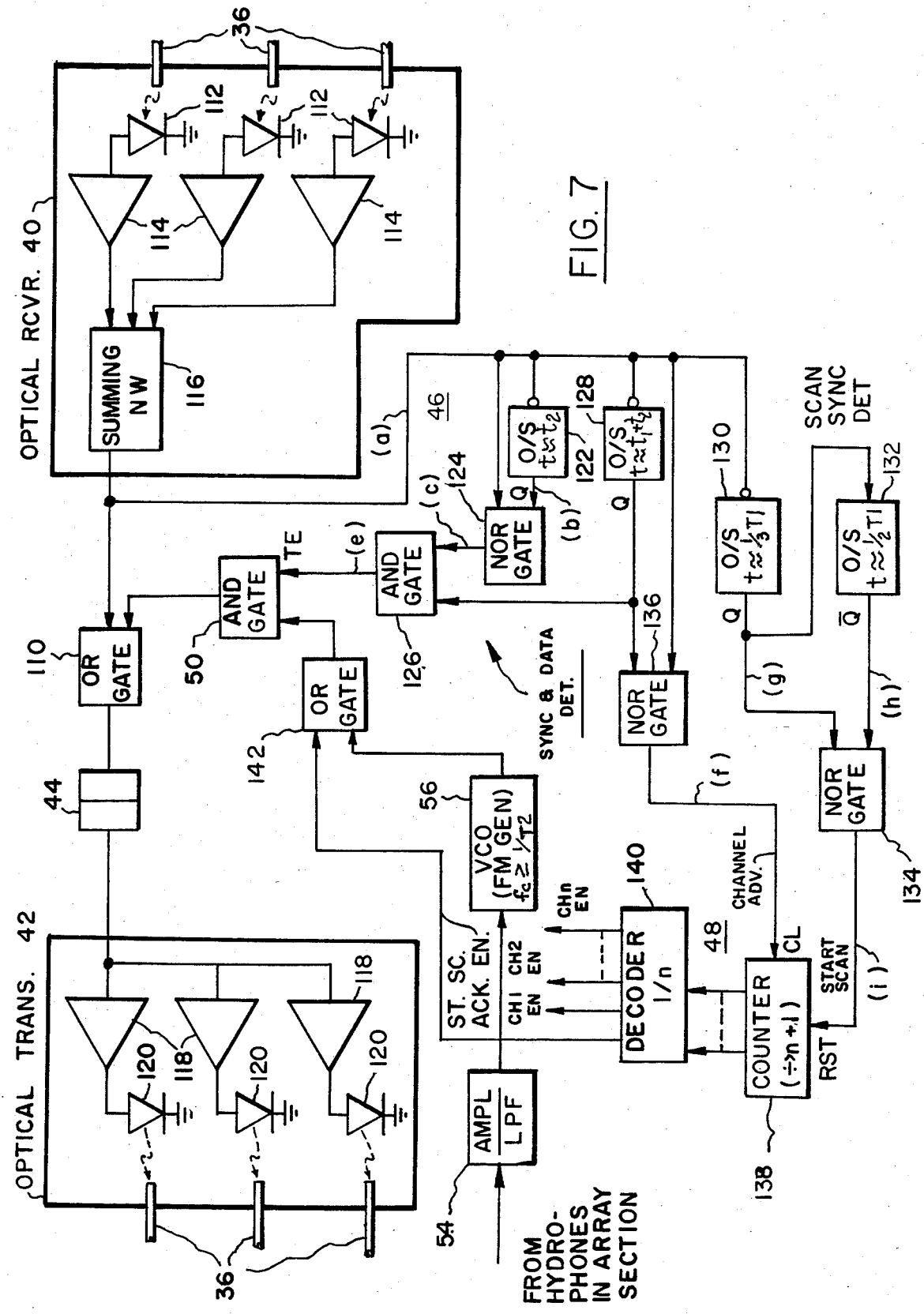
FIG. 7 is a block diagram illustrating the timing synchronizer and associated apparatus of each telemetry module used in the system shown in FIG. 3.
Figure 8:
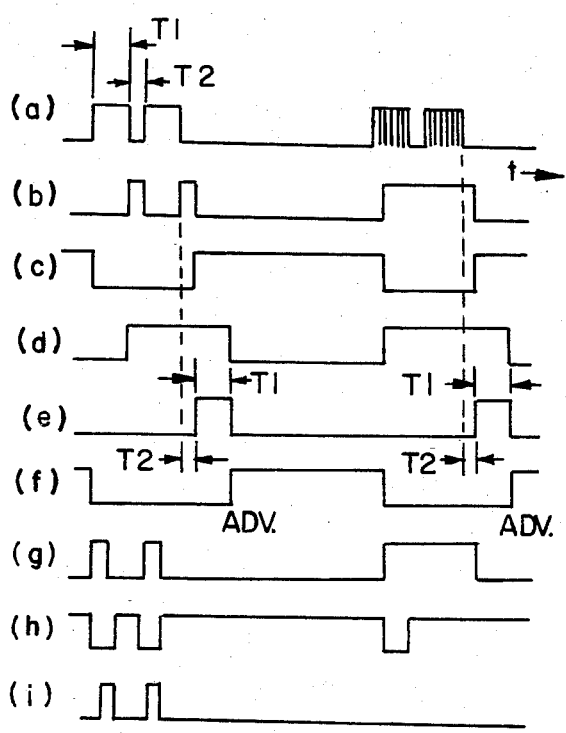
FIG. 8 shows timing diagrams illustrating the operation of the timing synchronizers shown in FIG. 7.

Referring next to FIG. 7 there is shown an implementation of the optical receiver 40 and transmitter 42 at the interface between consecutive array sections and an implementation which provides the timing synchronizer 46, submultiplex controller 48 and AND gate 50 of a typical telemetry module, such as TM-1. The wave forms shown in FIG. 8 explain the operation of the logic components. The interface extends through the connector 44 and includes an OR gate 110. The optical receiver handles three redundant optical fibers 36 which are disposed adjacent photodiodes 112. The electrical outputs from the photodiodes 112 are amplified in amplifiers 114. A summing network or amplifier 116 produces the electrical signals corresponding to the optical signals transmitted over the fiber optic lines provided by the redundant fibers 36. Only one of the fibers is needed. The remaining fibers and their associated photodiodes and amplifiers are used in the interest of reliability.

The transmitted signals go to the telemetry module, and particularly to the timing synchronizer 46 thereof. They are also retransmitted through the OR gate 110 to the optical transmitter 42 where they are amplified in three redundant amplifiers 118 and translated into optical signals in three redundant light emitting diodes or other optical emitters 120. The redundant optical fibers 36 in the next array section carry the optical signals along the array.

The sync and data detector of the timing synchronizer provides the TE and channel advance pulses. For purposes of illustration, consider that the telemetry module shown in FIG. 7 is TM-2. Accordingly, the first two pulses in a scan will be the scan sync pulse and the first sync acknowledgment pulse which will be followed by the first sweep sync pulse and data signal. The following pulses will be the successive sweep sync and data signals. Since the operation of the system is the same as for the first sweep sync and data signals, these successive sweep sync and data signals are not included in FIG. 8 to simplify the illustration.

A one shot 122 which is triggered by the negative going edge of an input signal applied thereto as indicated by the circle at the input thereof produces pulses shown in wave form (b) of FIG. 9. The one shot 122 and all other shots herein described are retriggerable by succeeding pulses at any time. The reset or time-out period of the one shot 122 is approximately the same as and determines the guard time T2. The one shot 122 is also triggered by the sweep sync signal and remains triggered until the expiration of its time out (approximately T2), also as shown in wave form (b). An NOR gate 124 to which the output of the optical receiver (wave form (a)) and the Q output of the one shot 122 are applied produces the pulses shown in wave form (c) of FIG. 8. The AND gate 126, which provides the transmit enable pulses (wave form (e) of FIG. 8), is enabled only after the sync ack pulse ends and after the data pulse ends. Another one shot 128 which has a time out period approximately equal to $T_1+T_2$ (e.g., 110 ns) is triggered by the negative going edge of the signals relayed from the optical receiver 40 (wave form (a)). It will be seen from wave form (d) that the AND gate 126 provides an output for a period T1 after the expiration of the guard time T2 following the sync ack pulse and the data pulse.

Consider next the scan sync detector of the timing synchronizer 46. It utilizes a first one shot 130 which times out in a period approximately one-third $T_1$ (e.g., 30 ns) to produce the pulse train shown in wave form (g). Another one shot 132 which times out in approximately one-half T1 produces the pulse train shown in wave form (h), since it is triggered by the leading edge of the pulses from the one shot 130. The $\overline{Q}$ output of the one shot 132 and the Q output of the one shot 130 are applied to an NOR gate 134. It will be seen that this NOR gate outputs a series of pulses shortly after the leading edge of a scan sync and each acknowledgment pulse. Although many pulses are produced, the first of them which is substantially coincident with the scan sync pulse is the only pulse which is effective as the start scan pulse. This exclusive effectiveness of the first pulse is due to the fact that it is used to reset a counter; once this is accomplished, the subsequent pulses are redundant. It should be noted that all such redundant reset pulses necessarily occur before the first channel advance pulse is generated.

The channel advance signal as shown in wave form (f) is obtained from the positive going edge of a square wave from an NOR gate 136 to which the Q output of the one shot 128 (wave form (d)) and the relayed signal (wave form (a)) are applied. This advance pulse occurs approximately coincident with the trailing edge of the last signal in an acknowledgment sequence or sweep sequence and after the link goes dark.

The submultiplex controller 48 is made up of a counter 138 which divides by at least n+1 and a 1 out of n decoder 140 which decodes the counter output and successively provides the channel enable currents to the hydrophones in the subarray associated with the telemetry module (DFOH-1 to DFOH-n, see FIG. 3). When the start scan pulse arrives it resets the counter. The decoder translates a count of all zeros at the input of the decoder into a first output thereof which is used as the start scan acknowledge enable (STSCACKEN). An OR gate 142 passes this enable signal which is transmitted through the AND gate 50 during the TE pulse. Each successive channel advance advances the counter so as to produce the CH1EN through CHnEN enable currents for the hydrophone light sources. The signal from each hydrophone passes through the amplifier and low pass filter 54 and a voltage control oscillator (VCO) which provides the FM generator 56, to the OR gate 142. The PFM data signal from the VCO 56 pass through the OR gate 142 and is sampled during each TE pulse. These data signals are transferred through the OR gate 110 and are relayed by the optical transmitter 42 onto the next array section.

Figure 11:
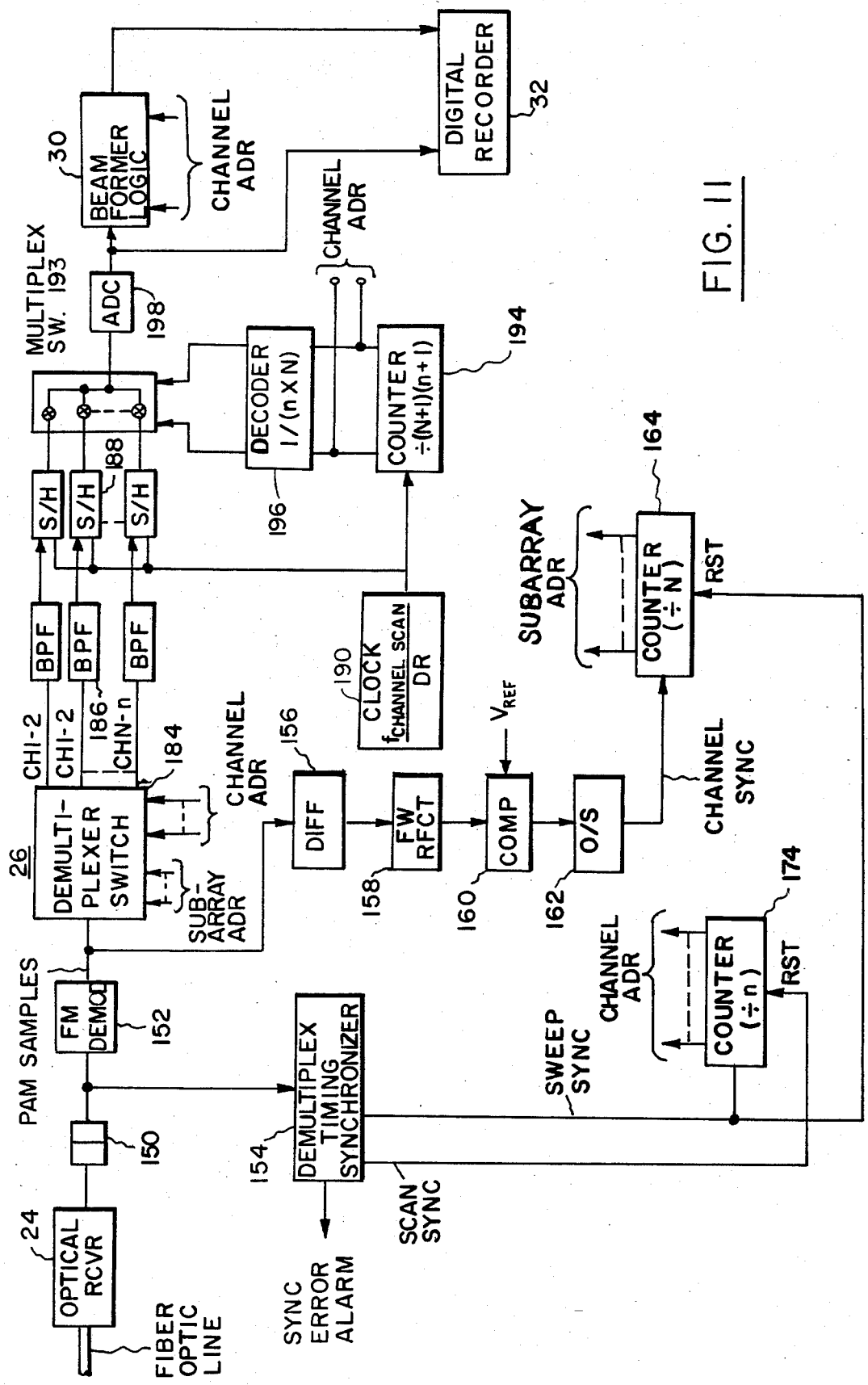
FIG. 11 is a block diagram illustrating the top side apparatus of the system shown in FIG. 1.

The top side apparatus 14 is shown in FIG. 11. The fiber optic output line from the array goes to an optical receiver which may be similar in design to the receiver 40 (FIG. 7). A connector 150 connects electrically to the output of the optical receiver 24. The serial stream of synchronization and data signals, in electrical form, is fed into the FM demodulator 152 and demultiplex timing synchronizer 154 of the demultiplexer apparatus. The FM demodulator 152 includes a conventional discriminator which converts the PFM samples into pulse amplitude modulated (PAM) samples corresponding thereto. The interval between samples is detected as noise, which occurs in the intervals between the samples because no carrier is present. A channel sync detector recovers channel sync pulses from these noise intervals. This detector has a differentiating circuit 156 which provides output pulses during the noise intervals. In the case where the guard band time is approximately 10 nanoseconds, as discussed for the operation of the array with a 10 KHz oversampling rate, the differentiating circuit 156 will output short pulses during each guard band time. These pulses are applied to a full wave rectifier 158 so that they are all output as positive pulses, if present. These pulses pass to a comparator 160 which distinguishes them from differentiated data pulses, which will always be of lower level. A one shot 162, having a time out period slightly less than the pulse sample durations T1 (e.g., 90 ns), provides the channel sync pulses to a channel address counter 164 of the demultiplexer 26.

Figure 12:
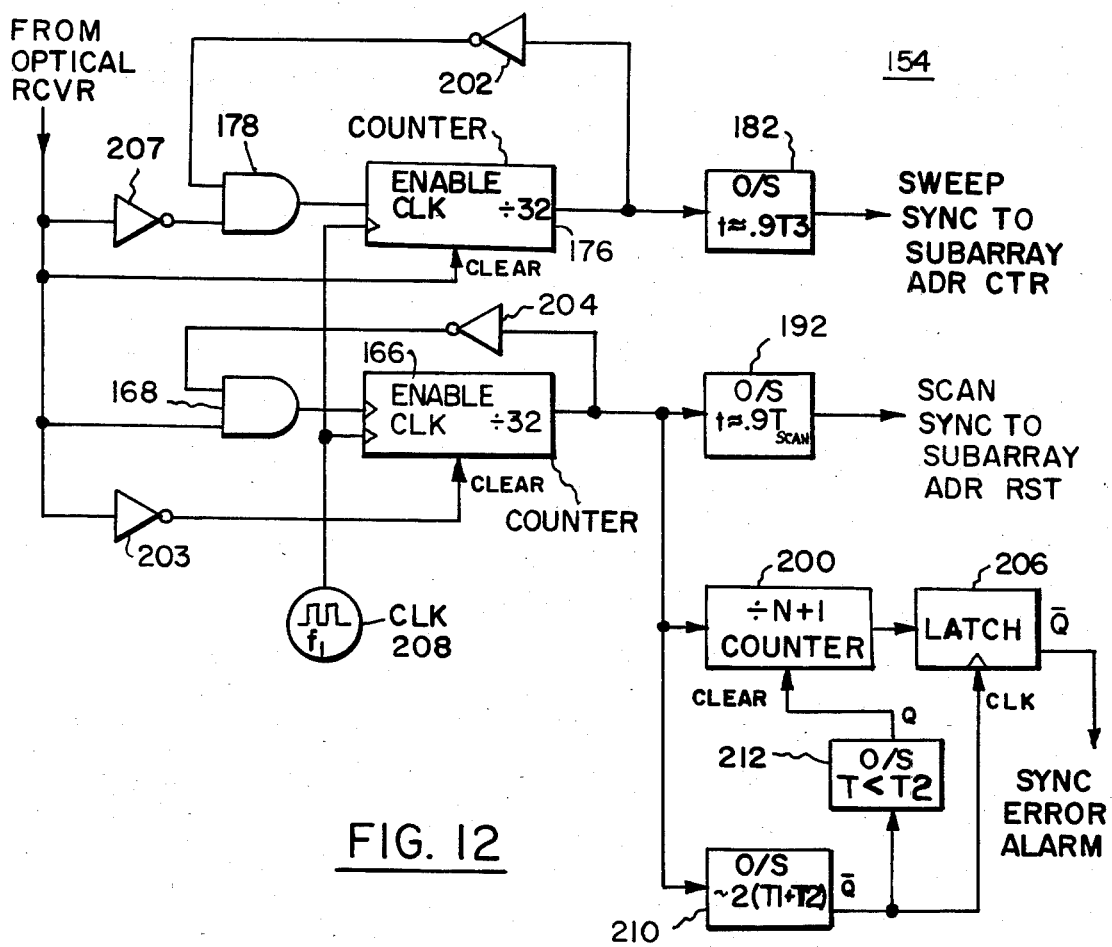
FIG. 12 is a block diagram illustrating the demultiplex timing synchronizer and associated apparatus of the topside apparatus shown in FIG. 11.
Figure 12A:
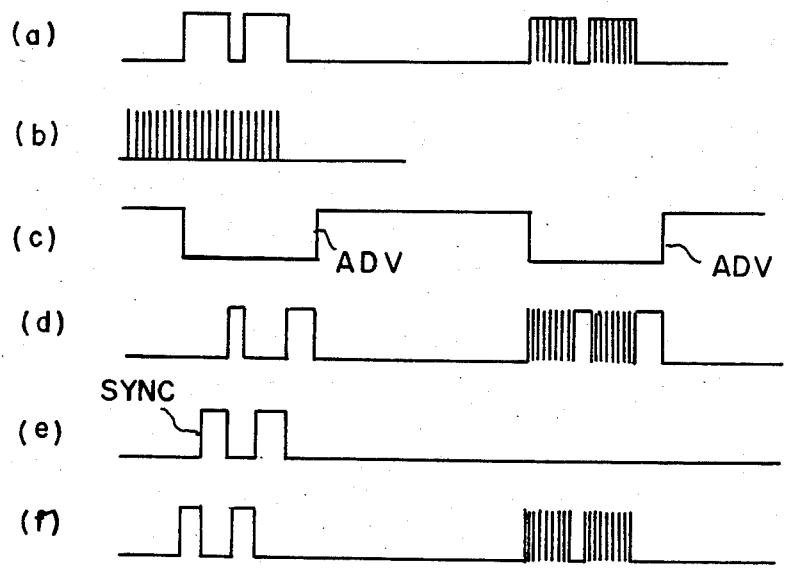
FIG. 12A is a timing diagram illustrating the operation of the demultiplex timing synchronizer shown in FIG. 12.

The demultiplex timing synchronizer obtains the scan sync and sweep sync pulses from the signals prior to FM demodulation. The demultiplex timing synchronizer 154 may be implemented by the circuitry shown in FIG. 12. Wave form diagrams depicting the operation of this circuitry are shown in FIG. 12A. Scan sync pulses are detected by a circuit having a counter 166 AND gate 168, inverters 203 and 204 and one shot 192. It will be noted that this scan sync detection process is identical to that performed in the timing synchronizer 46 of the telemetry modules. This circuit is therefore an alternative implementation to that previously described in connection with FIG. 7 (130, 132 & 134). Referring to FIG. 12A, wave form (a) shows the input wave form from the optical receiver 24. Since subsequent pulses would be treated analogously, only a scan sync pulse followed by a single sync ack pulse and a sweep sync followed by a single data pulse are shown. Wave form (b) depicts the output from a digital clock oscillator 208 which is a train of pulses with frequency $F_L$ substantially greater than $1/T_1$, where $T_1$ is the duration of each sync and data pulse received from the array. For example, for $T_1 = 100$ ns, $f_L$ may be $(0.01) 1/T_1$ or 1 GH$_z$.

Simply described, the counter 166 counts pulses from the clock 208 starting whenever the output from the optical receiver 24 is high and being stopped and cleared whenever this output goes low. If an interval of continuous light is received; such as a scan sync pulse, the counter 166 will be able to reach some predetermined (e.g. 32) counts, causing its output (divide by 32) to go high. Through inverter 204 and AND gate 168, this high output disables the counter 166 from receiving further counts.

Wave form (e) depicts the divide by 32 output of the counter 166. This output goes high after $T = 32 \times 1/f_L$ or about 32 ns of continuous light has been received, and is reset low immediately upon a negative transition in received light. Wave form (f) depicts the output of AND gate 168.

The positive transition of the output from clock 166 fires one shot 192, which in turn produces a pulse of duration T approximately equal to $0.9 \times T_{scan}$. The leading edge of this pulse is used as the scan sync output from the demultiplex timing synchronizer 154 and resets the subarray address counter 174 (FIG. 11). The counter 176, an AND gate 178 and inverters 202 and 207 operate in an analogous manner to the counter 166 and its associated components. The roles of light and dark (high and low outputs from the receiver, respectively) are reversed, so that the output of counter 176 makes a positive transition in response to a period of continuous dark instead of continuous light. Wave form (c) of FIG. 12A depicts this output from counter 176. Wave form (d) depicts the output of AND gate 178. Note that the guard time T2 between sync and date pulses is substantially shorter than the time required for the output of the counter 176 to go high.

Thus this output provides a pulse having its leading edge commencing at the beginning of the synchronizing interval and also at the beginning of each sweep. This pulse is used to trigger a one shot 182 having a time out period slightly less than sweep time (e.g., 0.9T3, such as 5 ms). The sweep sync pulse from the one shot 182 is counted in the channel address counter 174 (Ref. FIG. 11). The counter 174 is reset at the beginning of each scan and then counts the channels in each of the subarrays in synchronism with their occurrence, as timed by the sweep sync pulse. The sweep sync pulse also resets the subarray address counter 164. The count in the counter 174 indicates which subarray is being addressed. The subarray address and channel address completely designates which of the Nxn channels is the source of a PAM sample from the FM demodulator 152 which is arriving at a demultiplexer analog switch 184. The demultiplexer switch provides Nxn outputs, one for each channel.

The seismic output signals are generated from these samples by band pass filters 186, one of which is provided for each channel. Low end cut-off frequency of these filters is such that the lowest frequencies of interest are passed (e.g., 2 Hz) while the upper frequency limit $f_{nco}$ is chosen such that the highest frequency components of interest are passed. Giving consideration also that the output signals may be resampled without aliasing at a reasonable rate for digitization and recording (e.g., one KHz), the high frequency cut-off $f_{nco}$ may be as high as $\frac{1}{2} f_{scan}$, or 5 KHz for a 10 KHz array sampling rate.

The benefits of the use of the high or over-sampling rate in the system may now be reviewed. A principal advantage is that the timing errors are maximally one-half the period between samples. At 10 KHz over-sampling, this means that the timing errors will maximally be 50 microseconds. Such errors do not adversely affect the collection of data or the steering of the array. Oversampling also reduces interference from out of band interfering signals such as sea noise. This noise decreases by approximately 6 dB per octave with increasing frequency. Consider that the samples were taken at the Nyquist rate, then the highest sea noise level which would be folded back by aliasing into the band would be 12 dB below the in band sea noise. At a low sampling rate (e.g., one KHz) the sea noise interference is only suppressed 12 dB when aliased down. By oversampling (e.g., at 10 KHz instead of one KHz), aliased sea noise is reduced to 52 dB below the in band noise. Other noise such as machinery noise from the towing ship or other ships in the environment or sonar noise, if it occurs above the frequency band of interest, will be aliased down into the signal band when conventional (one KHz) sampling rates are used. Using of a 10 KHz sampling rate, places most of these noise sources, those with frequencies below 9.5 KHz, either in the reproduceable band so that they are not aliased, or in a band where they will be aliased to frequencies above the band of interest. In other words, the sea noise, machinery noise and other noise is detected and reproduced as noise which is readily filtered by the band pass filters 186.

Once the output signals are generated they may be resampled (data decimated) at a slower rate by means of sample and hold circuits 188. A clock pulse source 190 which may be derived from the master sync rate by dividing the channel sync pulses by a desired dividing ratio (f/channel-sync/DR) is used to drive a counter 194 and decoder 196. One output from this decoder is used to sample the output signals in the sample and hold circuits 188 at a rate/scan/DR. All samples are taken at once to reduce timing errors. The samples are applied to a multiplex switch 193, preferably through amplifiers (not shown), where they are reconverted into a serial stream or train of analog PAM samples. The multiplex switch 193 may be controlled by the clock 190 through the use of the counter 194 and the decoder 196. One of the switches in the multiplex switch 193 is enabled during each sampling time so that a string of samples equal to the number of channels (N×n) is provided. The counter 194, which divides by (N+1)×(n+1) (the total number of pulses per scan, including sync pulses), produces the channel address as well as inputs to the decoder 196.

The samples may be digitized by an analog to digital converter (ADC) 198. The converter provides a multi-bit digital signal for each sample of the type conventionally used in seismic systems, for example, 15 to 20 bits long. These digital samples may be recorded on existing digital recorders since they reoccur at a reduced sampling rate; each channel being sampled at one KHz. The digital signal is then within the bandwidth capabilities of existing recorders. The digital signals may also be applied to beam former logic 30 together with the channel address from the counter 194. The beam former logic may be of the type which is conventionally used to provide an output stream of data corresponding to a desired beam pattern. This output data stream may also be digitally recorded and the digital record may be used to generate seismograms when subject to computer processing as is conventional in this art. Accordingly, the beam former 30 and digital recorder 32 may be equipment which is normally in place and available for use in seismic vessels and vehicles.

Returning to FIG. 12 a sync error alarm is provided by a divide by (N+1) counter 200, a flip-flop or latch 206, and one shots 210 and 212. The counter 200 counts the positive transitions generated at the counter 166, which is equal to the number of sync ack pulses received, plus one for the scan sync pulse. After the synchronizing period, the one shot 210 times out and clocks the latch 206, storing the state of the divide by (N+1) counter 200. The $\overline{Q}$ output of the latch then provides a sync error level; being low if the proper number of sync ack pulses was received, and high otherwise. The one shot 212 provides a pulse to clear the counter 200, after its propagation delay. This delay is sufficient for the latch 206 to have stored the condition of the counter 200 before it is cleared.

The band pass filters 186, sample and hold circuits 188 and multiplex switch 192 may be replaced by charge transfer circuits (CTC) 210, as shown in FIG. 13. There is one charge transfer circuit for each channel. Only the charge transfer circuits for the first hydrophone in the first subarray and the first hydrophone in the second subarray and the n hydrophone in the NTH subarray are shown to simplify FIG. 13. Charge transfer circuits used may be of the type manufactured by Reticon Corporation of Sunnyvale, Calif. Change transfer devices are also described in U.S. Pat. No. 4,301,522 of Nov. 17, 1981. These devices have clock inputs indicated as $\phi_A$, $\phi_B$, $\phi_E$ and $\phi_S$. The $\phi_B$ clock controls the rate at which samples are passed through the device. If the device is being driven from a set of discrete samples at its input, as it is in this application, the $\phi_B$ must equal the sampling rate, e.g., 10 KHz. $\phi_A$ is the sampling clock, which is at the same frequency as $\phi_B$, but may be at a different phase. This clock permits the entry of an input sample into the device when the sample is ready, irrespective of the phase of the sample advance clock, $\phi_B$.

The sample advance clock, $\phi_B$ controls the filtering action of the device. For instance, if the clock frequency is 10 KHz, the CTC may be conveniently be designed for a cut-off or high-cut frequency between 200 Hz to 500 Hz. It may at the same time be designed for a low frequency cut-off, or low-cut frequency of 2 Hz. This will effect a filtering action on each of the samples much like the band pass filters 186 which were described above in connection with FIG. 11.

The sampling clock, $\phi_S$, passes the sample present at the end of the charge transfer brigade into a sample-and-hold circuit. This circuit is simply another stage in the charge-transfer sequence, wherein the transfer of charge can be controlled by an independent clock. This clock may be at a data decimated rate, for the samples reaching this point in the CTC have been high-cut, or anti-aliased filtered. An exemplary frequency in this case is 1 KHz, or 1/10 of the frequency of the transfer clock, $\phi_B$.

The output-enable clock, $\phi_E$, connects the charge in the sample-and-hold circuit to the output pin of the device. The outputs of all CTC's may be connected in parallel, so long as a single output-enable clock is energized at any one time. By this means, the ensemble of CTC's are made to act like an analog multiplexer.

A decoder 212 successively provides the $\phi_A$ clock to the charge transfer devices. In response to the group and channel addresses as may be provided by the counters 164 and 174, the PAM samples are then transferred to the first stages of the CTC devices in sequence. The data rate may be decimated by frequency dividers 213 and 215, and counter 217. The divider 214 divides the frequency from the channel sync output from the one shot 162 (FIG. 11) by the data decimation ratio (DR). For example, if/scan is 10 kHz and the desired signal bandwidth is 500 Hz, then the decimation ratio is 10 and the output frequency from 214 is one KHz times the number of pulses (data pulses and sync pulses), per scan. The divider 215 divides this decimated frequency by the number of pulses per scan to provide one pulse per 1/DR scans. This pulse is used as $\phi_S$ and provided simultaneously to all CTC's. The samples are selected one at a time by enabling the $\phi_E$ clock inputs of the CTC devices through the use of a 1 out of (N+1)×(n+1) decoder 216 which decodes the count in the record counter 217. Optionally, an external clock may be used to control the sampling and multiplexing of the output signals at the lower rate. This configuration is indicated with dashed lines 300. It will be observed that the function of the filters sample and hold circuits and an analog multiplex switch are all accomplished by the CTC devices, which simplifies the hardware used in the seismic system provided in accordance with the invention.

From the foregoing description it will be apparent that there has been provided an improved seismic system and an improved method of telemetering seismic data in seismic sensor arrays. Variations and modifications of the herein described system and method, within the scope of the invention, will undoubtedly suggest themselves to those skilled in the art. Accordingly, the foregoing description should be taken as illustrative and not in a limiting sense.

We claim:

1. The method of telemetering signals from an array of sensors being n in number which comprises the steps of time division multiplexing said sensor signals by deriving analog samples of said sensor signals successively from different ones of said n sensors, continuously monitoring said signals during successive overlapping to provide said analog samples, and transmitting said samples during successive non-overlapping time slots shorter than the slots of said analog samples.

2. The method according to claim 1 wherein said transmitting step is carried out after averaging said analog samples.

3. The method according to claim 1 wherein said array comprises a plurality of subarrays of said sensors, said plurality of subarrays being N in number, each of said subarrays having a plurality of said sensors, said plurality of sensors being n in number, said time division multiplexing step being carried out by successively sampling the signals from like ordered ones of said sensors in sequence until all of said sensors are sampled to provide a first scan of said array and then repeating said scans a plurality of times to provide said analog samples in overlapping time slots of duration proportional to the ratio 1/n, and said transmitting step comprises encoding said analog samples into corresponding FM signals, and transmitting said FM signals during successive non-overlapping time slots shorter than the time slots of said analog samples.

4. The method as set forth in claim 3 wherein said multiplexing step includes the steps of averaging said analog samples to provide signals which are encoded into said FM signals, and sampling said FM signals to provide bursts thereof in said shorter time slots.

5. The method according to any one of claims 1 through 4 wherein said signals are seismic signals and said sensors are seismic sensors, either hydrophones or geophones.

6. The method of telemetering signals from an array of sensors which comprises the steps of time division multiplexing said signals by sampling said signals to provide analog samples such that the samples from the same sensor are repetitive at a first rate higher than the Nyquist rate for the highest frequency component of interest of said signals, transmitting said samples to a receiving station sequentially at a second rate which is approximately proportional to said first rate multiplied by number of sensors in said array, demultiplexing and filtering said samples at said receiving station to provide output signals, time division multiplexing said output signals at a third rate lower than said first rate which is at least as high as said Nyquist rate for the highest frequency component of interest, and processing said multiplexed output signals to provide data from said array.

7. The method as set forth in claim 6 wherein said sensors are arranged in N subarrays of n sensors in said array, said second rate being related to said first rate by a factor approximately equal to the product of N and n.

8. The method as set forth in claim 6 wherein said first time division multiplexing step is carried out by submultiplexing signals from different sensors in successive ones of said subarrays in sequence until all of said subarrays are multiplexed to complete successive scans of said array at said first rate.

9. The method as set forth in claim 6 wherein said processing step is carried out by the steps of digitizing samples of said output signals, and formatting said digitized samples to steer said array.

10. The method according to any one of claims 6 through 9 wherein said signals are seismic signals and said sensors are seismic sensors.

11. The method according to claim 6 where said first rate is at least an order of magnitude higher than the Nyquist rate for the highest frequency component of interest of said signals, and said processing step includes time division multiplexing to provide serial output samples at a forth rate.

12. The method of telemetering data from an array of sensors arranged in a plurality of subarrays, each of which subarrays having a plurality of said sensors, which comprises the steps of time division multiplexing said signals into successive groups of successive second samples, each second sample in each group of second samples being from a different one of said subarrays of sensors, by submultiplexing the outputs from each sensor in each subarray into first samples during successive first time slots equal in number to the number of said subarrays in said array, and multiplexing said first samples during successive second time slots shorter than said first time slots and each at the end of a consecutive one of said first time slots to provide said successive groups of second samples where each second sample in each successive group is from a different one of said subarrays of sensors.

13. The method according to claim 12 wherein there are N subarrays of n sensors in said array, each of said sensors being sampled repeatedly at a rate, $f_{scan}$, said first samples being repetitive at a rate equal approximately to the product of n and $f_{scan}$ and said second samples being repetitive at a rate equal approximately to the product of $f_{scan}$, N and n.

14. The method according to claim 13 wherein $f_{scan}$ is the rate at which said array is repetitively scanned and is greater than the Nyquist rate for the highest frequency component of interest of said seismic signals.

15. The method according to claim 12 wherein said sensors are optical sensors which are enabled by illumination thereof, said submultiplexing step being carried out by illuminating said sensors for said first time slot durations.

16. The method according to claim 12 wherein said sensors are optical sensors which provide differential electrical outputs, said submultiplexing step including the steps of providing first output samples and second output samples respectively corresponding to the sum and difference of said differential outputs in successive groups of samples.

17. The method according to claim 14 further comprising transmitting second samples in analog form to a receiving station, demultiplexing and filtering said samples to provide output signals corresponding to said n×N signals from each of said sensors, multiplexing said output signals into consecutive third samples at a rate less than $f_{scan}$ and greater than at said Nyquist rate, and processing said third samples.

18. The method according to claim 12 further comprising the step of filtering said first samples to pass lower frequency components thereof prior to multiplexing of said first samples to produce said second samples.

19. The method according to claim 18 further comprising encoding said filtered first samples into PFM signals, and gating said PFM signals during said second time slots to provide said second samples.

20. The method according to claim 12 wherein said array has successive interlinked sections extending between head and tail ends thereof, each of said sections having a different one of said sensor subarrays associated therewith which further comprises the steps of generating scan synchronizing signals followed by a plurality of sweep synchronizing signals, transmitting said synchronizing signals from the tail of said array towards the head thereof, timing the multiplexing of said successive groups of second samples with said scan synchronizing signals and timing the submultiplexing of each of said subarrays during each scan of said array with said sweep synchronizing signals.

21. The method according to claim 12 wherein said array has successive sections extending between the tail and head of said array, each of said sections being interlinked by an optical transmission line, each section having a different one of said subarrays of sensors associated therewith, said sensors being optical sensors, and further comprising the steps of translating signals at the end of each section between optical and electrical form, translating the signals from said sensors from optical to electrical form, combining said electrical signals from the end of each section toward the head of said array with the signals in electrical form from the optical sensors of the subarray of sensors associated therewith, translating said combined signals into optical form, and transmitting said combined signals in optical form into the end toward the tail of said array of said optical transmission line of the next successive array section.

22. The method according to claim 21 further comprising the steps of generating in electrical form scan synchronizing signals followed by a plurality of sweep synchronizing signals, translating said synchronizing signals into corresponding optical signals and injecting them into the transmission line of the array section at the tail of said array, transmitting said synchronizing signals from the tail of said array towards the head thereof, timing the multiplexing of said successive groups of second samples with said scan synchronizing signals, and timing the submultiplexing of each of said subarrays during each scan of said array with said sweep synchronizing signals.

23. The method according to claim 20 wherein said scan synchronizing signals are transmitted as square wave pulses of like amplitude for durations approximately equal to the durations of said sensor signal samples, and said sweep synchronizing signals are transmitted as bursts of repetitive signals, said bursts also being of the same durations as said sensor signal samples.

24. The method according to claim 20 further comprising the step of generating a train of consecutive acknowledgment pulses each at a successive one of said sections, said train following each scan synchronizing pulse and in response thereto.

25. The method according to claim 20 further comprising the step of enabling the transmission of successive ones of said second samples in each group after intervals during which signals transmitted from a preceding section of said array are present and absent respectively.

26. The method according to any of claims 12-25 wherein said data is seismic data and said sensors are seismic sensors, either geophones or hydrophones.

27. A fiber optic seismic streamer system comprising a plurality of sections each extending from the tail to a head end of said streamer, each section including a fiber optic transmission line having means for translating electrical signals into optical signals at the end thereof toward the tail end and optical signals into electrical signals at the end thereof toward head end, each section also including a subarray of optical hydrophones each having means for producing outputs representing acoustic signals incident thereon when illuminated and providing electrical signal outputs, each section also including a telemetry unit connected to said hydrophones and to a junction of said line, said telemetry unit having means for time division multiplexing said hydrophones by successive illumination thereof and deriving analog samples of said electrical outputs therefrom, means for transmitting successively trains of consecutive first synchronizing signals followed by a group of second synchronizing signals at the tail end of said line and transmitting said synchronizing signals along said optical lines to each of said telemetry units for synchronizing the submultiplexing and transmission of said samples such that samples from different hydrophones in successive ones of said sections are transmitted in successive groups after said first synchronizing signal with each group of samples following each of said second synchronizing signals, and means responsive to the signals leaving the transmission line section at the head end of said line for demultiplexing and processing said analog signal samples.

28. The invention as set forth in claim 27 wherein electrical connectors provide the exclusive connections between said sections and between said synchronizing signal transmission means at the tail end of said line and the array section adjacent to the tail end of said line.

29. Apparatus for demultiplexing a serial PAM train of samples from a plurality of sensors which comprises a plurality of charge transfer devices having a signal input, and a plurality of stages between which charges representing signal samples are transferred, and a plurality of clock inputs for enabling the reception of signal samples at said signal input, for advancing said signal samples through said device, for advancing said samples to the output stage of said device, and for transferring said signal samples to said output, means for applying said sample train to said input, means for sequentially applying clock signals at a first rate to one of said clock inputs of successive ones of said devices, said first rate being at least equal to the rate of said samples in said train, means for applying clock signals to another of said clock inputs of all of said devices at a second rate lower than said first rate to enable said samples to be filtered as they propagate through said devices, means for applying clock signals at a third rate to still another of said clock inputs of all of said devices to derive data decimated samples of said PAM signals, and means for successively applying clock signals at a fourth rate to still another of said clock inputs of successive ones of said devices to derive multiplexed output signal samples from said devices on a common line output connected to the outputs of all of said devices.

30. The invention as set forth in claim 29 wherein said clock inputs comprise a sampling clock input $\phi_A$, a sample advance clock input $\phi_B$, a resample clock input $\phi_S$ and an output enable clock input $\phi_E$, said $\phi_A$ input being connected to said means which apply said clock signals to said one of said clock inputs, said $\phi_B$ input being connected to said means for applying clock signals to said another of said clock inputs, said $\phi_S$ and $\phi_E$ inputs being connected to said means for applying clock signals to said still another clock inputs.

31. Apparatus for telemetering signals from an array of sensors which comprises means for time division multiplexing said sensors to derive analog samples of said signals successively from different ones of said sensors, means for continuously monitoring said signals in real time during successive overlapping periods of time to provide said analog samples, and means for transmitting said samples during successive non-overlapping time slots shorter than the periods of said analog samples.

32. The invention according to claim 31 wherein said transmitting means includes means for averaging said samples.

33. The invention according to claim 31 wherein said array comprises a plurality of subarrays, N, of n of said sensors, each of said subarrays having a plurality of said channels each from a different one of said senors which carry said sensor signals therefrom, said time division multiplexing means comprising means for successively sampling said sensor signals from like ordered ones of said channels in sequence until all of said channels are sampled to provide a first scan of said array and means for repeating said scans a plurality of times to provide said analog samples in time slots of duration proportional to the ratio 1/n, and said transmitting means comprises means for encoding said samples into corresponding FM signals, and transmitting said FM signals during successive non-overlapping time slots shorter than the time slots of said samples.

34. The invention as set forth in claim 33 wherein said multiplexing means includes means for averaging said samples to provide signals which are encoded into said FM signals, and means for sampling said FM signals to provide bursts thereof in said shorter time slots.

35. The invention as set forth in any of claims 31 to 35 wherein said sensors are seismic sensors, either hydrophones or geophones, in a seismic system.

36. A system for telemetering signals from an array of sensors, which system comprises means for time division multiplexing said signals comprising means for sampling said signals to provide analog samples such that the samples from the same sensor are repetitive at a first rate higher than the Nyquist rate for the highest frequency component of interest of said signals, means for transmitting said samples to a receiving station sequentially at a second rate which is approximately proportional to said first rate multiplied by number of sensors in said array, means for demultiplexing said samples at said receiving station to provide output signals, means for time division multiplexing said output seismic signals at a third rate lower than said first rate which is at least as high as said Nyquist rate for the highest frequency component of interest, and means for processing said multiplexed and output signals to provide data from said array.

37. The invention as set forth in claim 36 wherein said sensors are arranged in N subarrays of n sensors in said array, said second rate being related to said first rate by a factor approximately equal to the product N×n.

38. The invention as set forth in claim 37 wherein said first time division multiplexing means comprises means for submultiplexing the signals from different ones of said sensors in successive ones of said subarrays in sequence until all of said subarrays are multiplexed to complete successive scans of said array at said first rate.

39. The invention as set forth in claim 36 wherein said processing means comprises means for digitizing samples of said output signals, and means for formatting said digitized samples to steer said array.

40. The invention as set forth in claim 36 wherein said sampling means which provides said samples at said first rate which is higher than the Nyquist rate for the highest frequency component of interest of said signals.

41. The invention as set forth in any of claims 36 to 40 wherein said signals are seismic signals and said sensors are seismic sensors, either hydrophones or geophones.

42. A system for telemetering data from an array of sensors arranged in a plurality of subarrays, each of which subarrays has a plurality of said sensors, which system comprises means for time division multiplexing said signals into successive groups of successive second samples, each second sample in each group of second samples being from a different one of said subarrays of sensors, said multiplexing means comprising means for submultiplexing the outputs from each sensor in each subarray into first samples during successive first time slots equal in number to the number of said subarrays in said array, and means for multiplexing said first samples during successive second time slots shorter than said first time slots and each at the end of a consecutive one of said first time slots to provide said successive groups of second samples where each second sample in each successive group is from a different one of said subarrays of sensors.

43. The invention according to claim 42 wherein there are N subarrays of n sensors in said array, said submultiplexing means having means for sampling said n sensors repeatedly at a rate, $f_{scan}$ with said first samples being repetitive at a rate equal approximately to the product of n and $f_{scan}$ and with said second samples being repetitive at a rate equal approximately to the product of $f_{scan}$, N and n.

44. The invention according to claim 43 wherein $f_{scan}$ is the rate at which said array is repetitively scanned and is greater than the Nyquist rate for the highest frequency component of interest of said signals.

45. The invention according to claim 42 wherein said sensors are optical sensors which are enabled by illumination thereof, said submultiplexing means comprising means for illuminating said sensors for said first time slot duration.

46. The invention according to claim 42 wherein said sensors are optical sensors which provide differential electrical outputs, said submultiplexing means comprising means for providing first output samples and second output samples respectively corresponding to the sum and difference of said differential outputs in alternate groups of samples.

47. The invention according to claim 44 further comprising means for transmitting second samples in analog form to a receiving station, means for demultiplexing and filtering said samples to provide output signals corresponding to said N×n signals from each of said sensors, means for multiplexing said output signals into consecutive third samples at a rate less than $f_{scan}$ and greater than at said Nyquist rate, and means for processing said third samples.

48. The invention according to claim 42 further comprising means for filtering said first samples to pass lower frequency components thereof prior to multiplexing of said first samples to produce said second samples.

49. The invention according to claim 48 further comprising means for encoding said filtered first samples into PFM signals, and means for gating said PFM signals during said second time slots to provide said second samples.

50. The invention according to claim 42 wherein said array has successive interlinked sections extending between head and tail ends thereof, each of said sections having a different one of said sensor subarrays associated therewith and further comprising means for generating scan synchronizing signals followed by a plurality of sweep synchronizing signals, means for transmitting said synchronizing signals from the tail of said array towards the head thereof, means for timing the multiplexing of said successive groups of second samples with said scan synchronizing signals and for timing the submultiplexing of each of said subarrays during each scan of said array with said sweep synchronizing signals.

51. The invention according to claim 42 wherein said array has successive sections extending between the tail and head of said array, each of said sections being interlinked by an optical transmission line, each section having a different one of said subarrays of sensors associated therewith, said sensors being optical sensors, and said system further comprising means for translating signals at the end of each section between optical and electrical form, means for translating the signals from said sensors from optical to electrical form, means for combining said electrical signals from the end of each section toward the head of said array with the signals in electrical form from the optical sensors of the subarray of sensors associated therewith, means for translating said combined signals into optical form, and means for transmitting said combined signals in optical form into the end toward the tail of said array of said optical transmission line of the next successive array section.

52. The invention according to claim 51 further comprising means for generating in electrical form scan synchronizing signals followed by a plurality of sweep synchronizing signals, means for translating said synchronizing signals into corresponding optical signals and injecting them into the transmission line of the array section at the tail of said array, means for transmitting said synchronizing signals from the tail of said array towards the head thereof, means for timing the multiplexing of said successive groups of second samples with said scan synchronizing signals, and means for timing the submultiplexing of each of said subarrays during each scan of said array with said sweep synchronizing signals.

53. The invention according to claim 50 wherein means for transmitting said scan synchronizing signals includes means for the transmission thereof as square wave pulses of like amplitude for durations approximately equal to the durations of said sensor signal samples, and said means for transmitting said sweep synchronizing signals includes means for the transmission thereof as bursts of repetitive signals, said bursts also being of the same durations as said sensor signal samples.

54. The invention according to claim 50 further comprising means for generating a train of consecutive acknowledgment pulses each at a successive ones of said sections, said train following each scan synchronizing pulse and in response thereto.

55. The invention according to claim 50 further comprising means for enabling the transmission of successive ones of said second samples in each train after intervals during which signals transmitted from a preceeding section of said array are present and absent respectively.

56. The invention according to any of claims 42 to 55 wherein said system is a seismic system, said data is seismic data and said sensors are seismic sensors, either hydrophones or geophones.

* * * * *